(12) United States Patent
Owensby et al.

(10) Patent No.: US 8,372,459 B2
(45) Date of Patent: Feb. 12, 2013

(54) COOKING APPARATUS AND METHOD OF COOKING

(75) Inventors: Joseph E. Owensby, Spartanburg, SC (US); Vincent A. Piucci, Spencer, MA (US); Charles R. Sperry, Leeds, MA (US); Dennis F. McNamara, Walpole, NH (US); Stephen D. Smith, Williamsburg, MA (US); Suzanne M. Scott, Springfield, VT (US)

(73) Assignee: Cryovac, Inc., Duncan, SC (US)

( * ) Notice: Subject to any disclaimer, the term of this patent is extended or adjusted under 35 U.S.C. 154(b) by 95 days.

(21) Appl. No.: 12/816,022

(22) Filed: Jun. 15, 2010

(65) Prior Publication Data

US 2011/0305810 A1    Dec. 15, 2011

(51) Int. Cl.
*A47J 37/06* (2006.01)
*A23L 1/01* (2006.01)

(52) U.S. Cl. ........ 426/231; 426/232; 426/523; 426/410; 99/422; 99/379; 99/389; 99/391

(58) Field of Classification Search .......... 426/231–232, 426/523, 510–511, 392, 412; 99/349, 374, 99/379, 422, 329 RT, 389–391; *A47J 37/06; A23L 001/01*
See application file for complete search history.

(56) References Cited

U.S. PATENT DOCUMENTS

| | | | |
|---|---|---|---|
| 1,401,688 A | 12/1921 | Forshee | |
| 2,057,501 A | 10/1936 | Parr | |
| 2,246,317 A | 6/1941 | Parr | |
| 2,446,956 A | 8/1948 | Ross | |
| 2,587,314 A | 2/1952 | Hall | |
| 2,597,541 A | 5/1952 | Squires et al. | |
| 2,652,718 A | 9/1953 | Wiseman | |
| 3,098,426 A | 7/1963 | Lee, Sr. | |
| 3,581,654 A | 6/1971 | Tescula | |
| 3,593,572 A | 7/1971 | Hansen | |
| 3,602,038 A | 8/1971 | Hansen | |
| 3,632,962 A | 1/1972 | Cherniak | |
| 3,688,566 A | 9/1972 | Hansen | |
| 3,707,906 A | 1/1973 | Marrie | |
| 3,714,885 A | 2/1973 | Wertheimer et al. | |
| 3,719,507 A | 3/1973 | Bardeau | |
| 3,732,727 A | 5/1973 | Hinnergardt et al. | |
| 3,776,124 A | 12/1973 | Morley | |

(Continued)

OTHER PUBLICATIONS

International Search Report/Written Opinion mailed Oct. 28, 2011 in corresponding PCT application No. PCT/US2011/040435.

(Continued)

*Primary Examiner* — Steven Leff
(74) *Attorney, Agent, or Firm* — Nields, Lemack & Frame, LLC

(57) ABSTRACT

An apparatus and method for cooking food, such as meat, protein, vegetable, or soup is disclosed. In one embodiment, the food items are supplied in a flexible polymer package that can withstand the temperature needed to cook the item. The cooking apparatus has two cooking surfaces in the form of heated platens, which may be arranged in a vertical orientation. These platens come together to simultaneously contact both sides of the food item. The cooking apparatus further includes a controller, configured to prepare the food using various control system algorithms. The apparatus cooks the food item from both sides to affect rapid and even cooking. It uses a combination of temperature, time, food thickness, platen force and a cooking code that is unique for each food type. The control system algorithm uses some or all of these parameters to determine precisely when the food item is cooked correctly.

33 Claims, 21 Drawing Sheets

U.S. PATENT DOCUMENTS

| | | | | |
|---|---|---|---|---|
| 3,824,916 | A | 7/1974 | Green et al. | |
| 3,872,716 | A | 3/1975 | Hansen | |
| 3,943,332 | A | 3/1976 | Marsh | |
| 3,956,924 | A | 5/1976 | Hansen et al. | |
| 4,011,431 | A | 3/1977 | Levin | |
| 4,052,890 | A | 10/1977 | Kammlah et al. | |
| 4,091,720 | A | 5/1978 | Wheeler | |
| 4,137,333 | A * | 1/1979 | Daswick | 426/120 |
| 4,141,239 | A | 2/1979 | Gilbert | |
| 4,150,609 | A | 4/1979 | McClean | |
| 4,167,900 | A | 9/1979 | Eichler | |
| 4,172,903 | A * | 10/1979 | Daswick | 426/394 |
| 4,178,500 | A | 12/1979 | Brindopke | |
| 4,206,345 | A | 6/1980 | Maass et al. | |
| 4,224,864 | A | 9/1980 | Wendell | |
| 4,244,284 | A | 1/1981 | Flavan, Jr. et al. | |
| 4,412,610 | A | 11/1983 | Flavan, Jr. et al. | |
| 4,567,819 | A | 2/1986 | Adamson | |
| 4,580,909 | A * | 4/1986 | McIntosh | 374/141 |
| 4,601,237 | A | 7/1986 | Harter et al. | |
| 4,763,571 | A | 8/1988 | Bergling et al. | |
| 4,939,927 | A | 7/1990 | Johnston | |
| 5,011,042 | A | 4/1991 | Bunce et al. | |
| 5,082,373 | A | 1/1992 | Rohde et al. | |
| 5,099,682 | A | 3/1992 | Denomme et al. | |
| 5,129,313 | A | 7/1992 | Coppier | |
| 5,138,938 | A | 8/1992 | McClean | |
| 5,147,068 | A | 9/1992 | Wright | |
| 5,285,041 | A | 2/1994 | Wright | |
| 5,321,232 | A | 6/1994 | Ogle | |
| 5,380,986 | A | 1/1995 | Mullen | |
| 5,426,280 | A | 6/1995 | Smith | |
| 5,499,574 | A | 3/1996 | Esposito | |
| 5,504,311 | A | 4/1996 | DuBuis et al. | |
| 5,606,905 | A | 3/1997 | Boehm et al. | |
| 5,619,907 | A | 4/1997 | Orgelmacher | |
| 5,625,147 | A | 4/1997 | Miles et al. | |
| 5,711,606 | A | 1/1998 | Koether | |
| 5,735,191 | A | 4/1998 | Russell et al. | |
| 5,736,718 | A | 4/1998 | Levinson | |
| 5,755,150 | A | 5/1998 | Matsumoto et al. | |
| 5,843,500 | A | 12/1998 | Guarino | |
| 5,872,314 | A | 2/1999 | Clinton | |
| 5,992,302 | A | 11/1999 | Geisler | |
| 5,994,683 | A | 11/1999 | Braunisch et al. | |
| 6,001,655 | A | 12/1999 | Spadaro et al. | |
| 6,003,436 | A * | 12/1999 | Masel et al. | 99/389 |
| 6,012,380 | A | 1/2000 | Hermansson | |
| 6,016,741 | A | 1/2000 | Tsai et al. | |
| 6,026,736 | A | 2/2000 | Turner | |
| 6,040,565 | A | 3/2000 | Akerlind | |
| 6,077,552 | A | 6/2000 | Chimenti et al. | |
| 6,079,321 | A | 6/2000 | Harter et al. | |
| 6,124,583 | A | 9/2000 | Bowers | |
| 6,130,416 | A | 10/2000 | Gabbai | |
| 6,142,666 | A | 11/2000 | Koether et al. | |
| 6,167,759 | B1 | 1/2001 | Bond et al. | |
| 6,167,796 | B1 | 1/2001 | Wright et al. | |
| 6,170,335 | B1 | 1/2001 | Clinton | |
| 6,299,920 | B1 | 10/2001 | Saksena | |
| 6,299,921 | B1 | 10/2001 | Loffler et al. | |
| 6,487,963 | B1 | 12/2002 | Wu | |
| 6,730,890 | B2 | 5/2004 | Kish et al. | |
| 6,814,487 | B2 * | 11/2004 | Singh et al. | 374/208 |
| 6,849,830 | B2 | 2/2005 | Damiano et al. | |
| 7,060,953 | B2 | 6/2006 | Ishikawa et al. | |
| 7,064,298 | B2 | 6/2006 | Li | |
| 7,069,838 | B2 | 7/2006 | Payen | |
| 7,109,422 | B2 | 9/2006 | Hiroshi et al. | |
| 7,183,525 | B2 | 2/2007 | Fuchs | |
| 7,191,698 | B2 | 3/2007 | Bond et al. | |
| 7,360,533 | B2 | 4/2008 | McFadden | |
| 7,449,665 | B2 | 11/2008 | Fadelli et al. | |
| 7,473,869 | B2 | 1/2009 | Chun | |
| 7,478,585 | B2 | 1/2009 | Wang | |
| 2006/0099307 | A1 * | 5/2006 | Mercer et al. | 426/113 |
| 2006/0112833 | A1 | 6/2006 | Blaschke | |
| 2006/0213373 | A1 | 9/2006 | Fernandez et al. | |
| 2006/0254430 | A1 * | 11/2006 | Nevarez et al. | 99/349 |
| 2006/0266346 | A1 | 11/2006 | Grant | |
| 2007/0006740 | A1 | 1/2007 | Lam | |
| 2007/0089728 | A1 | 4/2007 | Wang | |
| 2007/0134378 | A1 | 6/2007 | Burton et al. | |
| 2008/0056624 | A1 | 3/2008 | Chudley | |
| 2008/0087268 | A1 | 4/2008 | Burton | |
| 2008/0196595 | A1 | 8/2008 | Krishnan et al. | |
| 2009/0000489 | A1 | 1/2009 | Krasznai | |
| 2009/0092723 | A1 | 4/2009 | Flynn, Jr. et al. | |
| 2012/0148713 | A1 | 6/2012 | Owensby et al. | |

OTHER PUBLICATIONS

Office Action—Restriction—mailed Jul. 19, 2012 in corresponding U.S. Appl. No. 13/160,590.

Office Action mailed Aug. 10, 2012 in corresponding U.S. Appl. No. 13/160,590.

Final Rejection mailed Nov. 27, 2012 in corresponding U.S. Appl. No. 13/160,590.

* cited by examiner

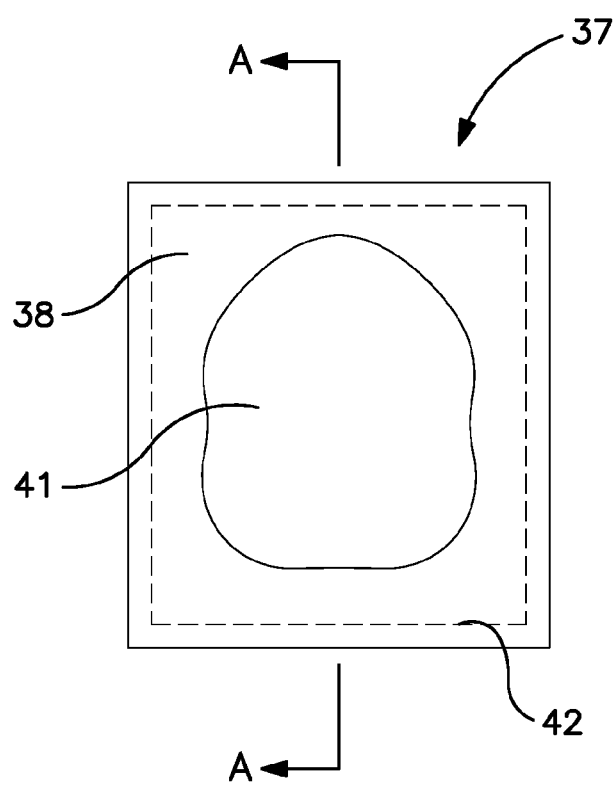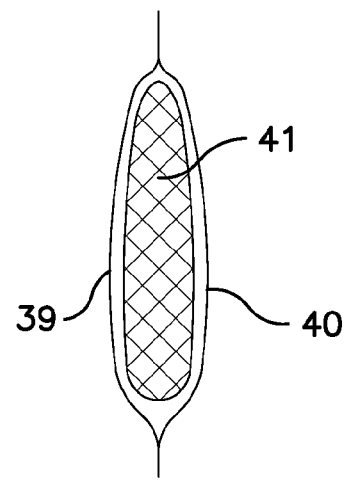
FIG. 12A    FIG. 12B

| Meat | Fahrenheit | Celsius |
|---|---|---|
| Beef: | | |
| Rare | 120° – 125° | 45° – 50° |
| Medium–Rare | 130° – 135° | 55° – 60° |
| Medium | 140° – 145° | 60° – 65° |
| Medium–Well | 150° – 155° | 65° – 70° |
| Well Done | 160° and above | 70° and above |
| Lamb: | | |
| Rare | 135° | 60° |
| Medium–Rare | 140° – 150° | 60° – 65° |
| Medium | 160° | 70° |
| Well Done | 165° and above | 75° and above |
| Poultry: | | |
| Chicken | 165° – 175° | 75° – 80° |
| Turkey | 165° – 175° | 75° – 80° |
| Pork: | | |
| Fresh Pork | 160° – 170° | 65° – 70° |
| Ham (Fully–Cooked) | 140° | 60° |
| Ham (Un–cooked) | 160° | 70° |

FIG. 16

COOKING APPARATUS AND METHOD OF COOKING

BACKGROUND OF THE INVENTION

In today's fast paced society, the ability to prepare food quickly is at a premium. The number of take out restaurants, ready to eat meals available at grocery stores, and fast food establishments are a testament to the premium placed on fast, convenient food.

One method to quickly prepare food is using food sealed in cook-in packages. There are many advantages of cook-in packaging, probably the most obvious of which is food safety. The food package remains closed until the food product is completely cooked and ready to be served. Because of this, the food does not come into contact with the cooking apparatus or the operator, eliminating the possibility of contamination. Also eliminated is cross-contamination, so all proteins and vegetables can be prepared in any order in the same apparatus. Another advantage is that clean-up of the cooking apparatus is simple and easy.

The cook-in package allows for a large variety of food products to be available, and is not limited to simple products such as hamburgers and chicken patties. Other examples include marinated meat, fish or poultry, vegetables with sauce, soups and stews, etc, with any combination of spice and flavorings. Since the products are prepared and packaged in a controlled environment, it is possible to keep the contents, and hence the flavor of the prepared food, extremely consistent.

However, the advantages of cook-in packaging are maximized when cooked using a cooking apparatus optimized for the preparation of these packages. For example, there are maximum temperature ratings, mandated by government agencies, for the material used to package the food. In addition, because the food is sealed, the cooking process must be completed without ever testing the internal temperature of the food item.

Thus, there is a need for an improved apparatus and cooking method to maximize the benefits of cook-in packaging for food products.

SUMMARY OF THE INVENTION

An apparatus and method for cooking or rethermalizing food, such as meat, protein, vegetable, or soup are disclosed. In one embodiment, the food items are supplied in a flexible polymer package that can withstand the temperature needed to cook the item. This ensures cleanliness of the apparatus, and eliminates direct contact with the food product by the apparatus or the operator. The cooking apparatus has two cooking surfaces in the form of heated platens, which may be arranged in a vertical orientation. These platens come together to simultaneously contact both sides of the food item. The cooking apparatus further includes a controller, configured to prepare the food using various control system algorithms. The apparatus cooks the food item from both sides to affect rapid and even cooking. It uses a combination of temperature, time, food thickness, platen force and a cooking code that is unique for each food type. The control system algorithm uses some or all of these parameters to determine precisely when the food item is cooked correctly. With this cooking method, each food item is cooked to its desired doneness in a repeatable manner. It also allows items such as beef, to be cooked as desired, from rare to well done. It also insures that items such as poultry, pork and others that need to be cooked thoroughly are not undercooked.

This cooking method, in combination with the precise function of the apparatus described herein, insures that all food products will be flavored and cooked correctly, regardless of where or how they are prepared. It also allows a large variety of foods can be prepared on demand by selecting the desired item and placing it into the apparatus.

BRIEF DESCRIPTION OF THE DRAWINGS

FIGS. 12A-B show the packaging for a food item;

FIG. 16 shows a table of various food items and internal cook temperatures;

DETAILED DESCRIPTION OF THE INVENTION

Figure 1:
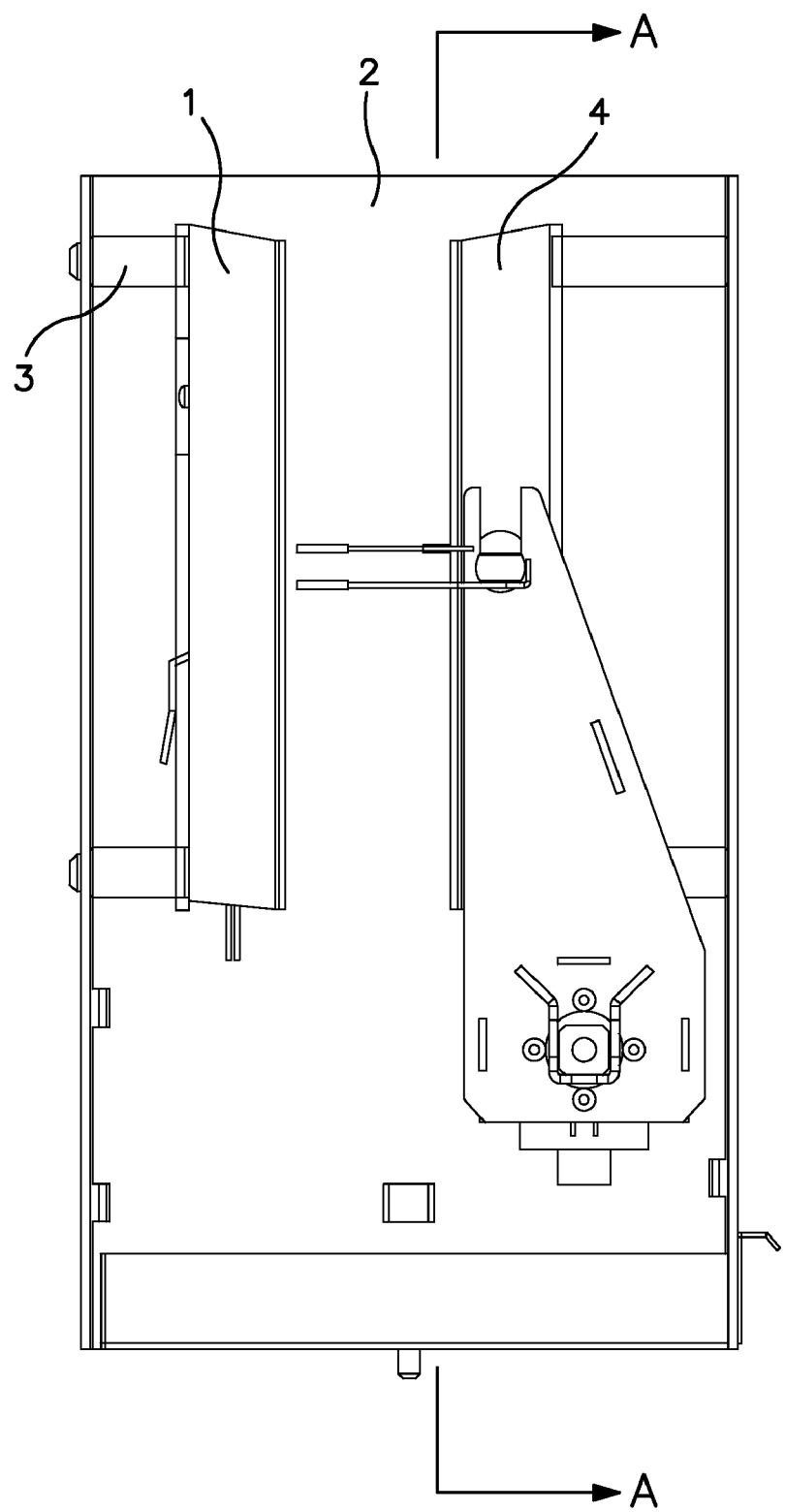
FIG. 1 is a side elevation view of one embodiment of the cooking apparatus.
Figure 2:
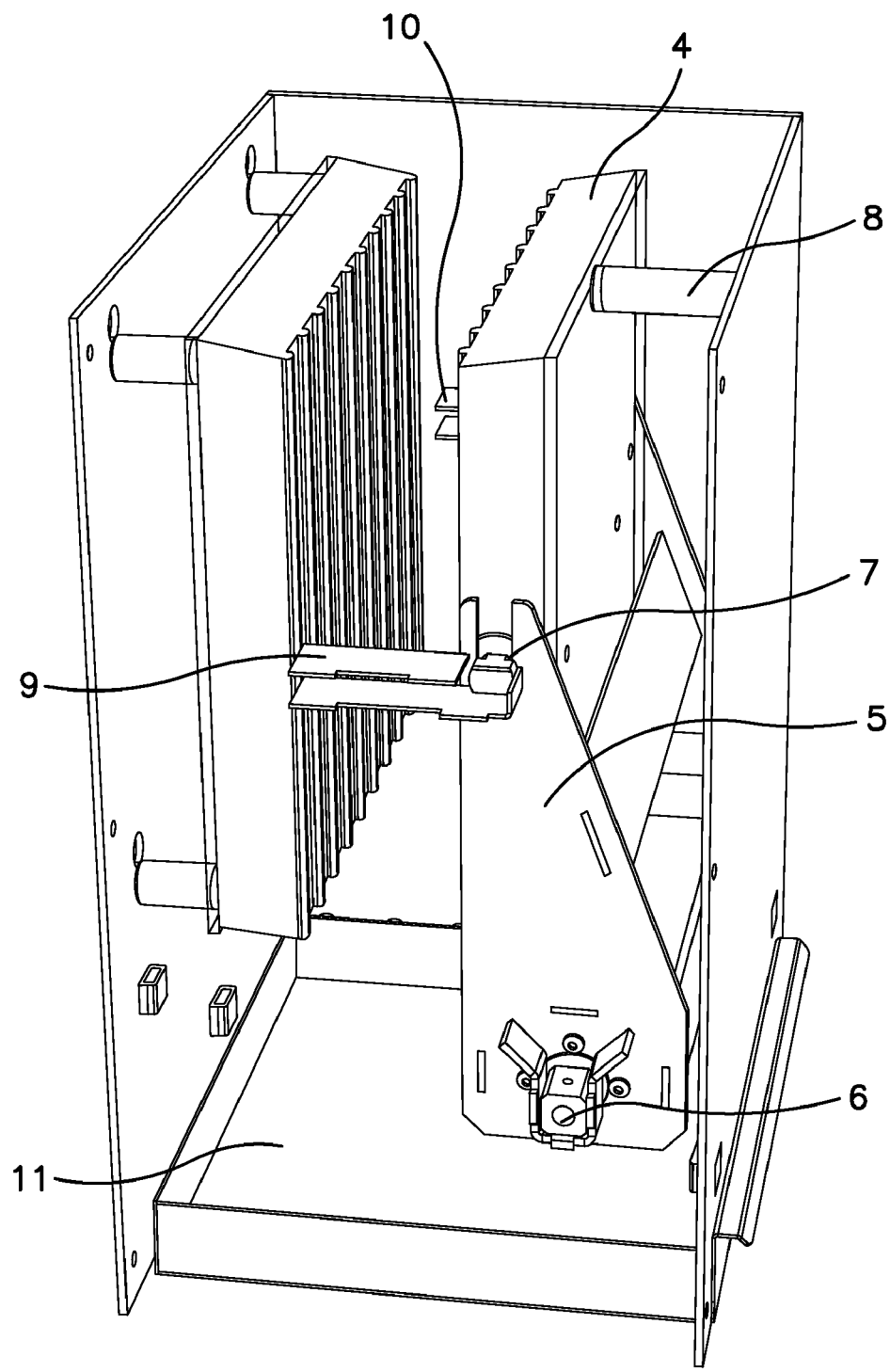
FIG. 2 is a rotated view of the apparatus of FIG. 1.
Figure 3:
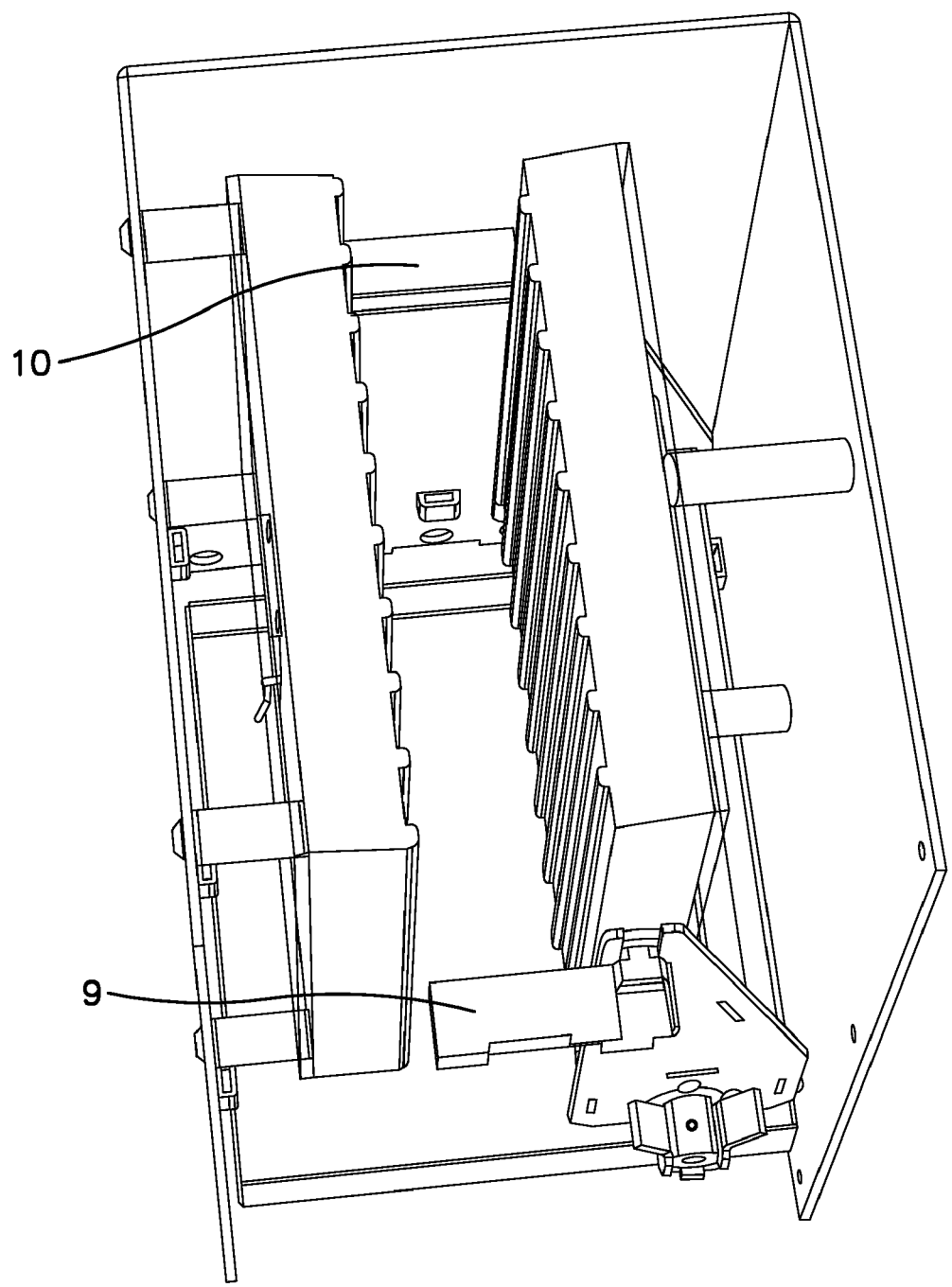
FIG. 3 is a second rotated view of the apparatus of FIG. 1.

FIG. 1 is a side elevation view and FIGS. 2 and 3 are rotated views of the internal mechanism in accordance with one embodiment of the current invention. One side of the frame 2 has been removed for clarity. The apparatus includes a first cooking platen 1, which may be rigidly mounted to the frame 2 using one or more stand-offs 3. In some embodiments, the first platen 1 is stationary or fixed in position. These standoffs 3 are made from a temperature insulating material that is capable of withstanding the temperature of the platen 1 when heated. One such material is Poly Ether Ether Keytone (PEEK), although others are within the scope of the invention. By using these standoffs 3, the heat produced in the platen 1 is not transferred to the frame 2. A second, movable cooking platen 4 is mounted to a swivel bracket 5. This bracket 5 is mounted to drive means, such as an electric motor 6, whose end is visible in FIG. 2. The second platen 4 is mounted to the bracket 5 such that the platen 4 is able to rotate in the bracket mount 7. Insulating standoffs 8 may be mounted on the back side the platen 4 so as to serve as stops when the platen 4 is in the retracted position as shown in FIG. 1. These standoffs 8 may be made of PEEK as described above. In other embodiments, the standoffs are not used, as the drive means 6 and controller (not shown) are configured to insure that the platen 4 does not touch the frame 2. In other embodiments, the standoffs 8 are mounted on the frame 2. Guide brackets 9,10 are part of the frame 2 and may be mounted to the sides of the frame 2. The brackets 9,10 guide the bracket mounts 7 of the movable platen 4 as it moves toward the first platen 1, keeping it in the correct plane. In some embodiments, the platen 4 can rotate and compensate for irregularly shaped food items, helping to keep the force and contact consistent. Also visible is an optional removable drip tray 11 that collects grease or other food by-products in the event that a food package ruptures or leaks during the cooking process.

It should be noted that although the disclosure describes a movable platen 4 that rotates on a swivel bracket 5 toward the first platen 1 using a motor 6, other embodiments are within the scope of the invention. For example, the movable platen 4 may move linearly toward the first platen 1. Furthermore, although the motor 6 is shown near the lower or bottom end of the movable platen 4, the invention is not limited to this embodiment. The drive means may also be near the upper end of the movable platen 4, or directly behind it, such as in line with guide brackets 9, 10.

Figure 4:
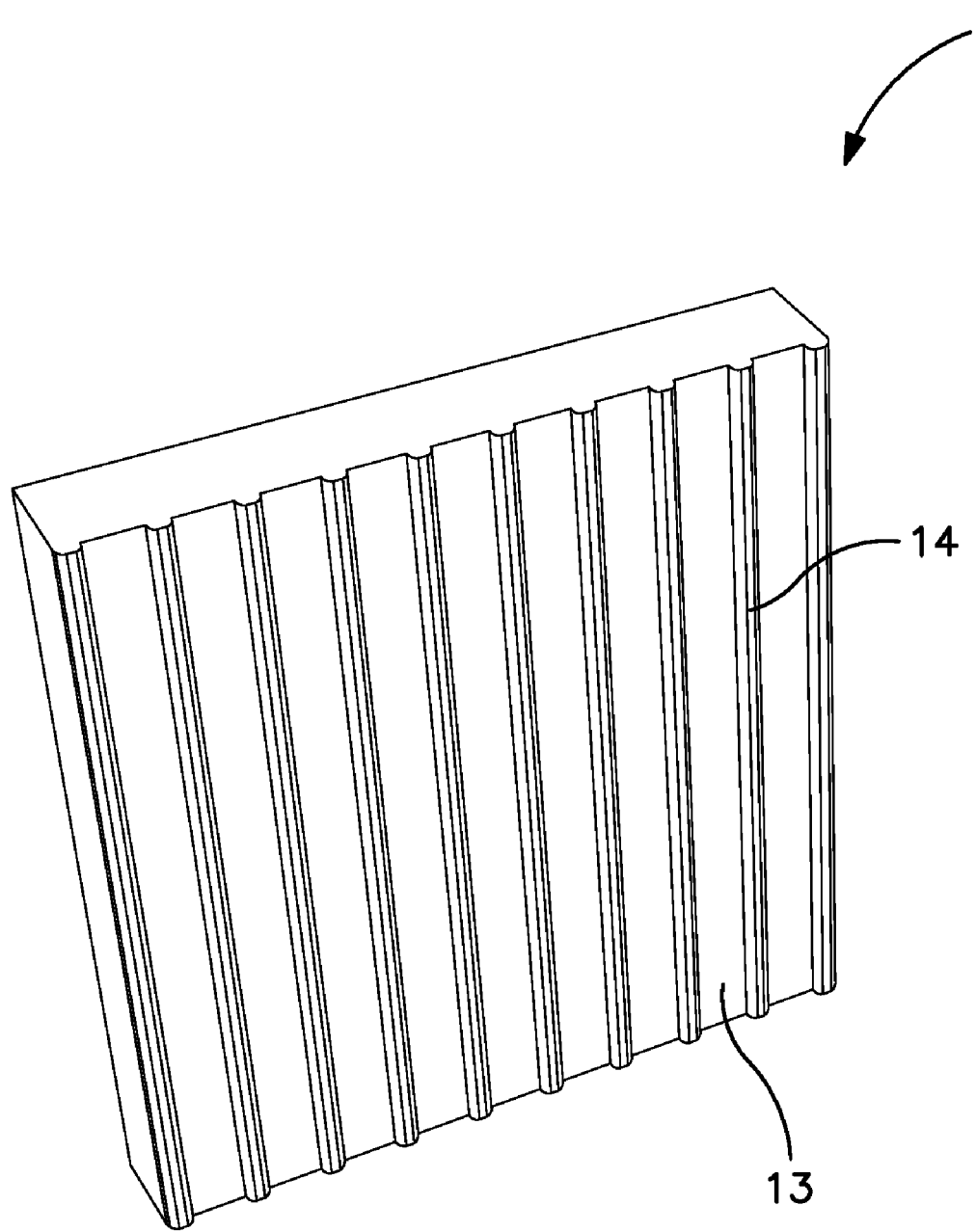
FIG. 4 is a side view of the first platen.

FIG. 4 shows the first platen 1 with the cooking side 13 visible. In one embodiment, a series of raised ribs 14 are arrayed across the cooking surface 13, preferably in a vertical orientation. These ribs 14 aid in cooking by increasing the area of the heated cooking surface 13 that comes into contact with the food item, and add grill marks to the food item to enhance the appearance when cooked. The vertical orientation of the ribs 14 allows fluids to flow down to the drip tray 11 in the event of a leak. Additionally, this orientation allows the grease and other fluids to flow into the lower portion or pocket of the package, and away from the food item being cooked. In other embodiments, the ribs 14 may be oriented differently, such as horizontally or diagonally. The platen 1 is manufactured from a material with a high rate of heat transfer, such as but not limited to aluminum. The cooking surface 13 is preferably coated. The coating can be an anodized or hard coat, but preferably contains a non-stick component, such as Teflon. This could be a Teflon® coating alone, or a more durable coating such as electroless nickel with Teflon impregnation. The dimensions of the platen 1 are determined by the size of the food products to be cooked, so various size platens may be made. In one embodiment, the platen 1 is square with a length and width of about 7 inches and a thickness of about 1 inch. The ridges 14 are raised about ⅛ inch and may be about ¾ inch apart and ⅛ inch wide. The dimensions of the platen 1 as well as the size and number of ridges may be varied, depending on the application and the food products to be used therewith. The shape of the ridges 14 can also be changed to give a different appearance to the cooked food item. For example, the ridges 14 may be arranged in a cross-hatch pattern, a chevron, a serpentine pattern, or any other suitable design.

Figure 5:
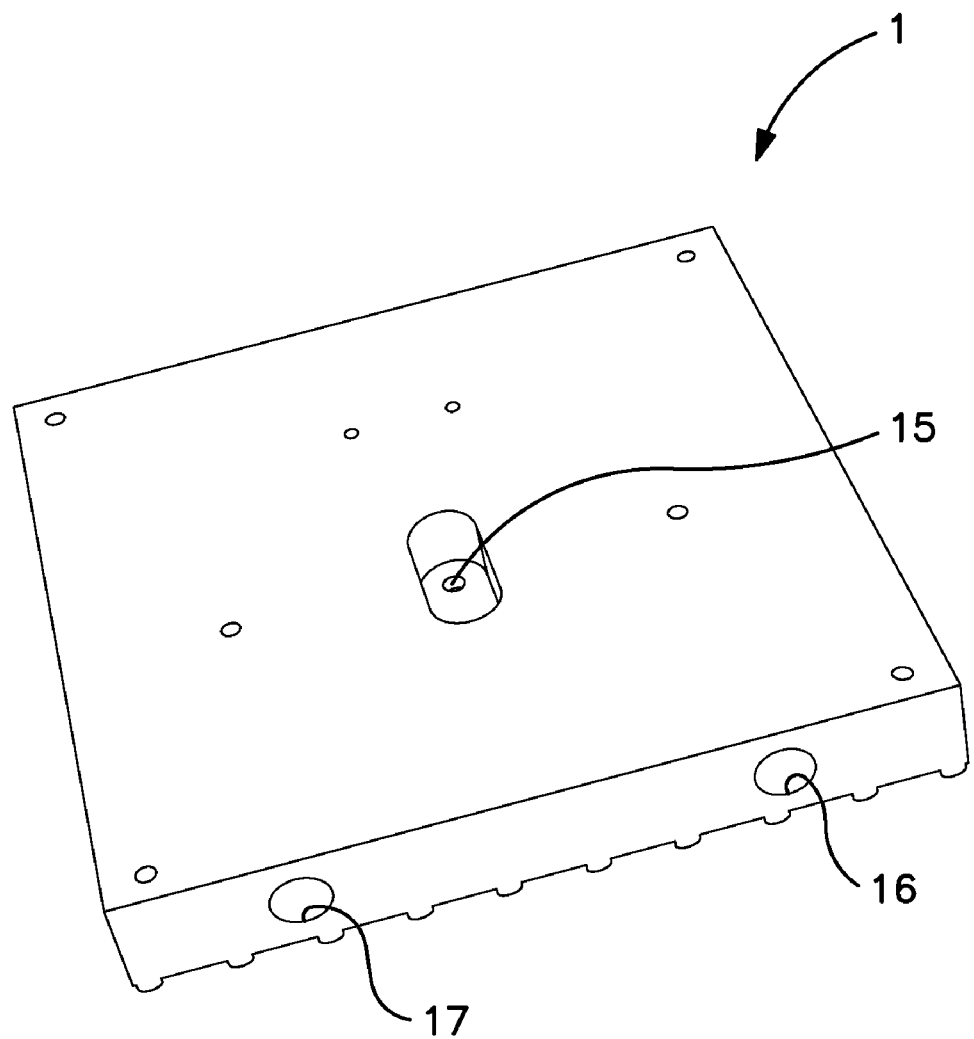
FIG. 5 is a bottom view of the first platen.
Figure 6:
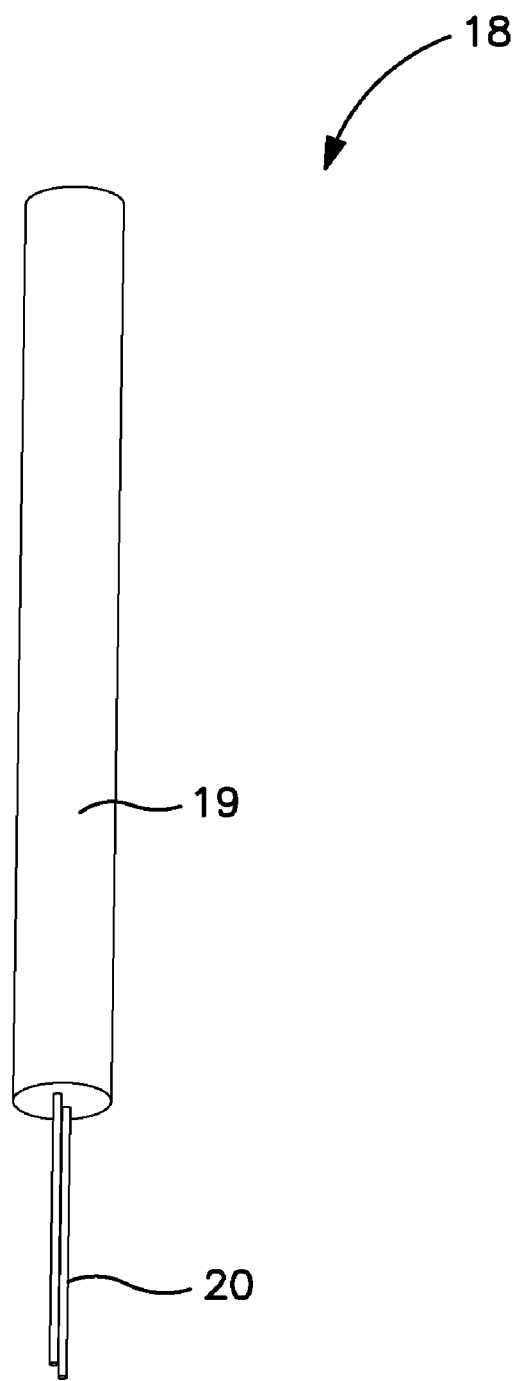
FIG. 6 is a view of the heating element according to one embodiment.

FIG. 5 shows a rear and bottom view of the first platen 1. A thermocouple location 15 allows a thermocouple (not shown) to be inserted into the first platen 1. This thermocouple measures the temperature of the platen 1 and is used to control cooking temperature. In some embodiments, a standard type J or K thermocouple can be used. In other embodiments, another type of temperature sensor, such as an RTD, may be used. In some embodiments, temperature switches may not be preferred because they tend to have a large on/off temperature range, generally on the order of 15° F., and tighter control may be preferable. Cavities 16,17 are bored into the platen 1 for insertion of heat producing devices. Although two cavities are shown, any number may be used. The cavities 16,17 may be on the bottom side of the platen 1, although cavities on the other sides are also within the scope of the invention. The platens 1,4 can be heated by a variety of heat producing devices, as long as the devices have sufficient capacity to heat the platens 1,4 sufficiently to cook the food product and create heat in a reasonable amount of time. One common heating device is shown in FIG. 6. This heater 18 is a resistance heater cartridge, such as those manufactured by Wattlow Electric Manufacturing Company of St. Louis, Mo. It comprises a barrel 19 made from stainless steel or the like, that contains a coil of nickel chromium resistance wire. The leads 20 connect to an electric power source. When electricity passes through the coil, it heats the cartridge. The length, diameter and construction are chosen for the amount of heat needed. In this application, with the platen as described, two cartridges may be used in each platen. The cartridges are ½ inch in diameter and 5 inches long and produce 200 watts of power, for a total of 400 watts per platen, or 800 watts total cooking power. The amount of power needed is related to the overall size and volume of the platens. For example, a larger platen size may require additional cartridges or higher wattage cartridges. Smaller platens may require less heat capacity. Other types or configurations of heaters can be used. Resistance heat coils can be cast into the platens during their manufacture. Heat sources such as ceramic heaters, PTC heaters or others can be used. In some embodiments, the heating devices are controlled independently, while in other embodiments, the heating devices are commonly controlled.

Figure 7:
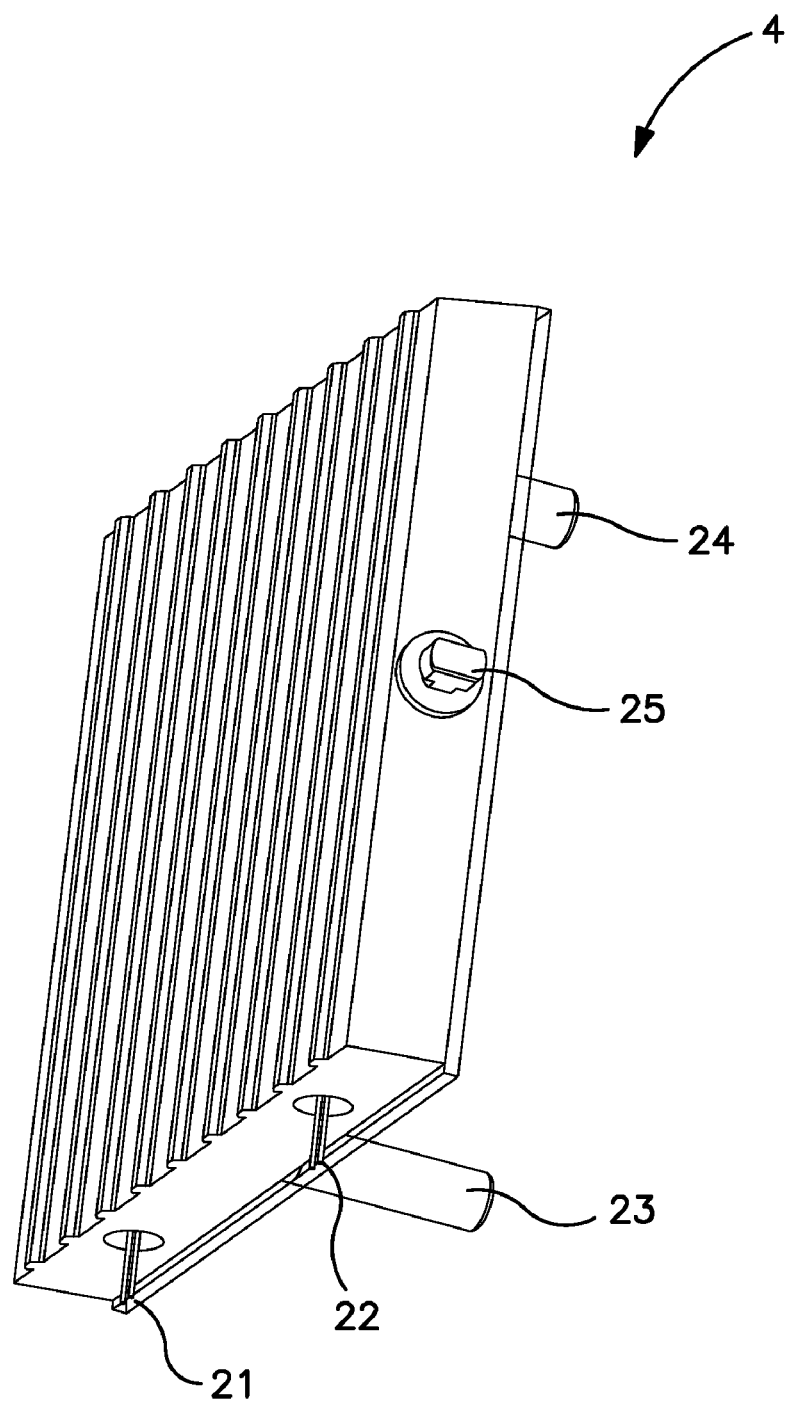
FIG. 7 is a view of the movable platen with heating elements.

FIG. 7 shows the movable platen 4. Like the first platen, the movable platen 4 may include ribs on its cooking surface. On the bottom side, one or more heater leads 21,22 are shown. On the back side (opposite the cooking surface), one or more standoffs 23,24 are shown, as described in connection with FIG. 2. In other embodiments, the standoffs may be located on the frame 2. In one embodiment, a swiveling mount 25 is located on the side of the movable platen 4. In some embodiments, the movable platen 4 may have a temperature sensing device, such as a thermocouple. In other embodiments, no temperature sensing device is placed on the movable platen 4. In some embodiments, measuring the temperature of the first platen 1 may be sufficient for temperature control of the system with correct design and construction. If desired, the movable platen 4 can contain a thermocouple, and the heaters can be controlled individually.

Figure 8:
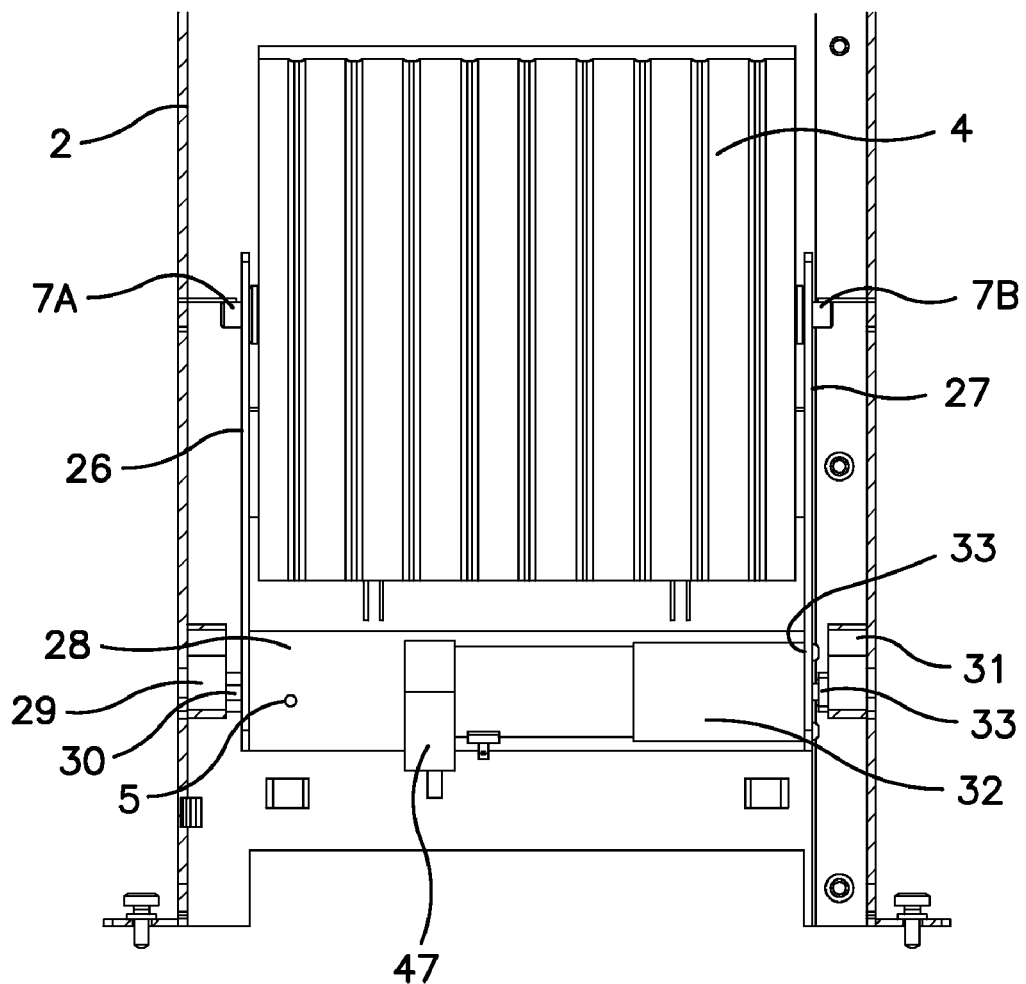
FIG. 8 shows a front view of movable platen.
Figure 9:
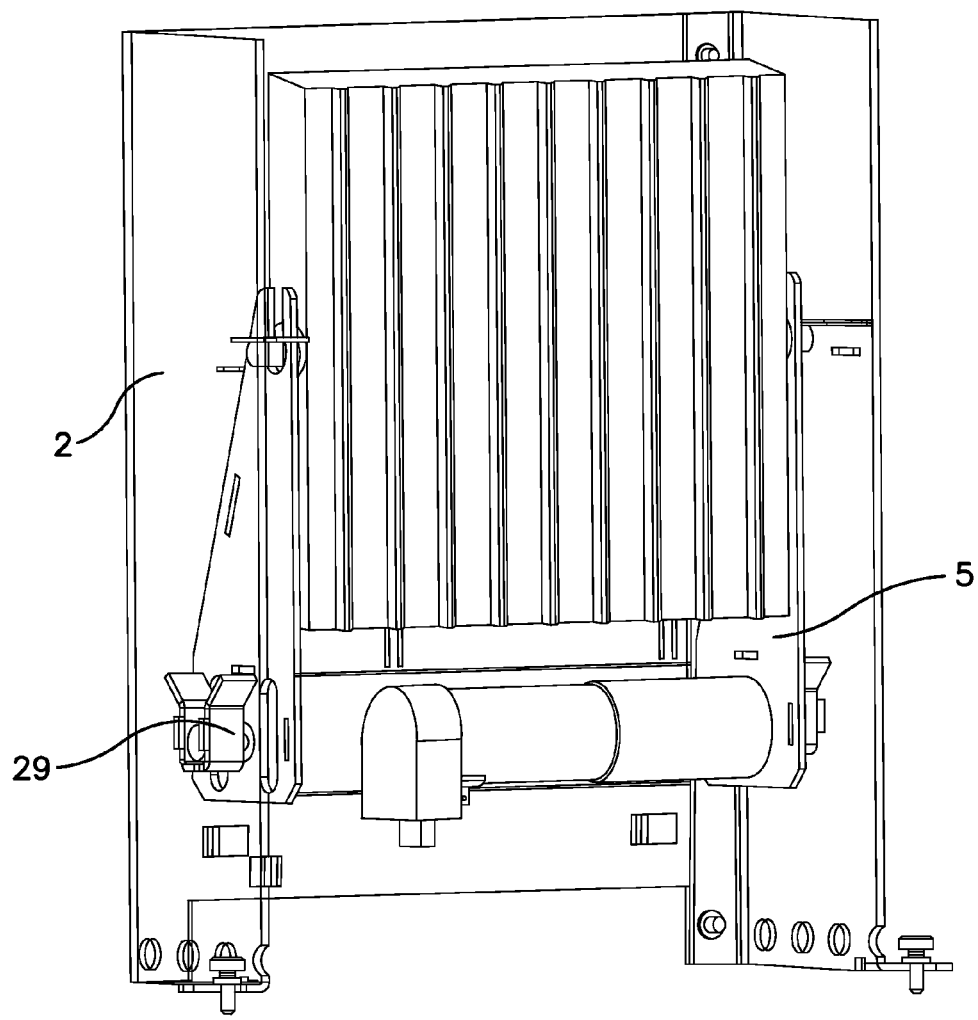
FIG. 9 shows a perspective view of the movable platen.

FIGS. 8 and 9 are views through section A-A of FIG. 1. In FIG. 9, the left frame wall has been made transparent for clarity. The movable platen 4 is mounted by swiveling mounts 7A,7B to the swivel bracket 5. The swivel bracket 5 comprises a left side 26, right side 27 and horizontal section 28 to make a rigid mount. The left side 26 of the bracket 5 is mounted to the frame 2 in a swiveling manner by a frame bracket 29 that is part of the frame and a shaft 30 that is part of the swivel bracket 5. A second frame bracket 31 mounted to the right side of frame 2. Drive means, such as a drive motor 32, is used to rotate the swivel bracket 5 which, in turn, moves the movable platen 4. The motor 32 is connected to the swivel bracket 5 by its mounting face 33 so that the motor 32 rotates with the swivel bracket 5. The motor shaft 33 connects to the frame bracket 31 in a fixed manner so that when the motor 32 is energized, the fixed shaft 30 causes the motor 32 and swivel bracket 5 to rotate around the axis defined by the frame mounts 29,31. This rotation moves the movable platen 4 horizontally toward the first platen 1. The swivel mounts 7A, 7B allow the movable platen 4 to remain parallel to the first platen 1. The choice of drive motor 32 depends on the particular design and size of the apparatus. Motor application is well known in the art. In one embodiment, a suitable drive motor, manufactured by Pittman is model 8324s007, which is a 24 volt D.C. motor with an encoder, attached to a P32-3-181 gearhead with a 181:1 gear ratio.

Figure 10:
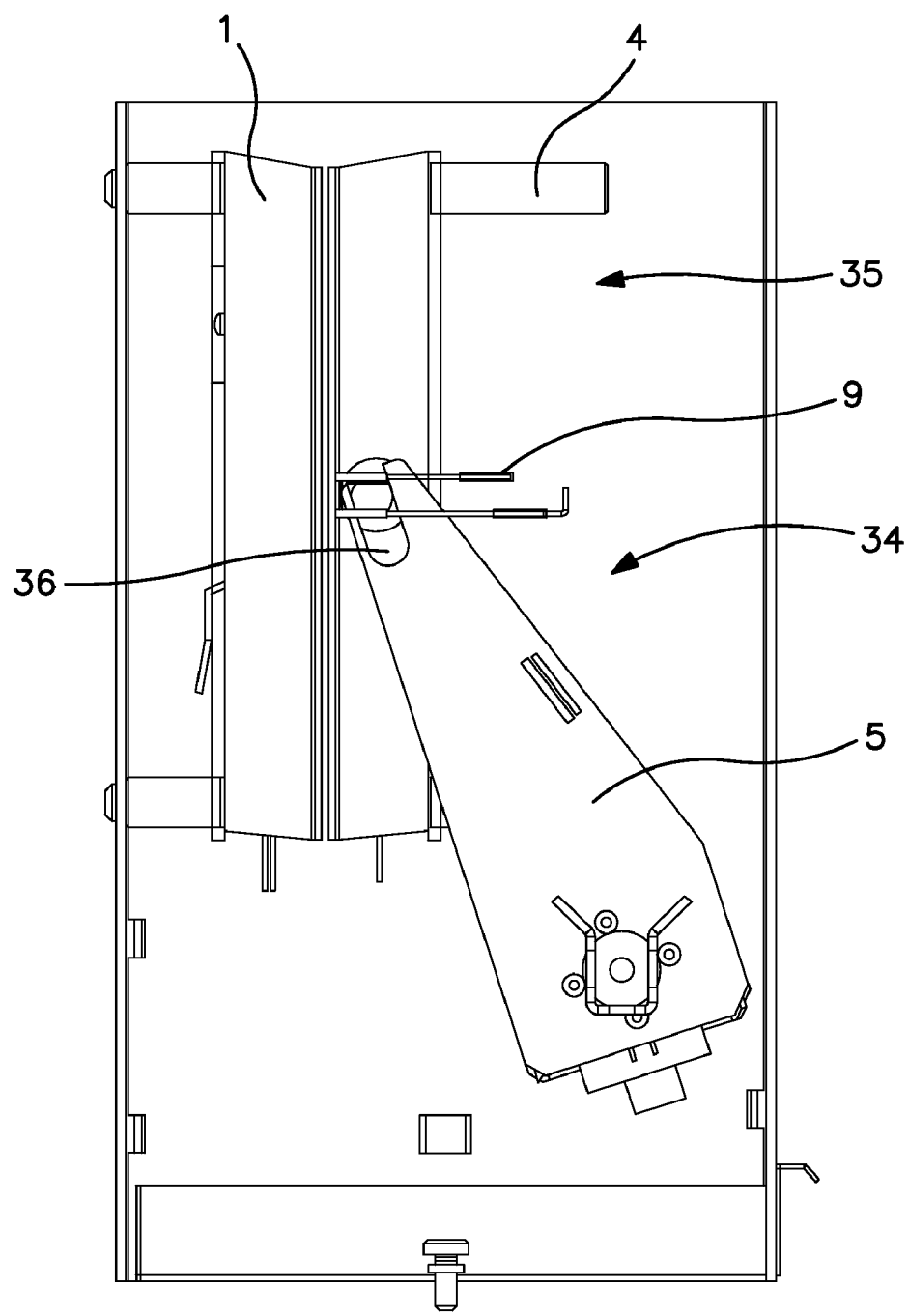
FIG. 10 shows a side view of the apparatus in the closed position.

FIG. 10 shows the cutaway side view of the apparatus with the platens 1,4 in the closed position. The motor 32 has been energized, causing the rotation of the swivel bracket 5 in a counterclockwise direction 34, moving the movable platen 4 toward the first platen 1. Since the mounts 25, as seen in FIG. 7, connecting to the movable platen 1 project into the guide brackets 9 and have a flat section that resides in the guide, the rotation of the swivel bracket translates into a linear motion 35 of the movable platen 4. The elongated slot 36 in the swivel bracket allows the distance between its rotational axis and the platen mount to vary and allow the conversion of rotation to linear movement. The aforementioned flat sections on the movable platen mounts keep the movable platen 4 from rotating, so it stays parallel to the first platen 1. This closed position may used when the apparatus is heating when first started or during idle time between cooking cycles. This helps to keep the heat from escaping and, as such, is more efficient during heat up and idle.

Figure 11:
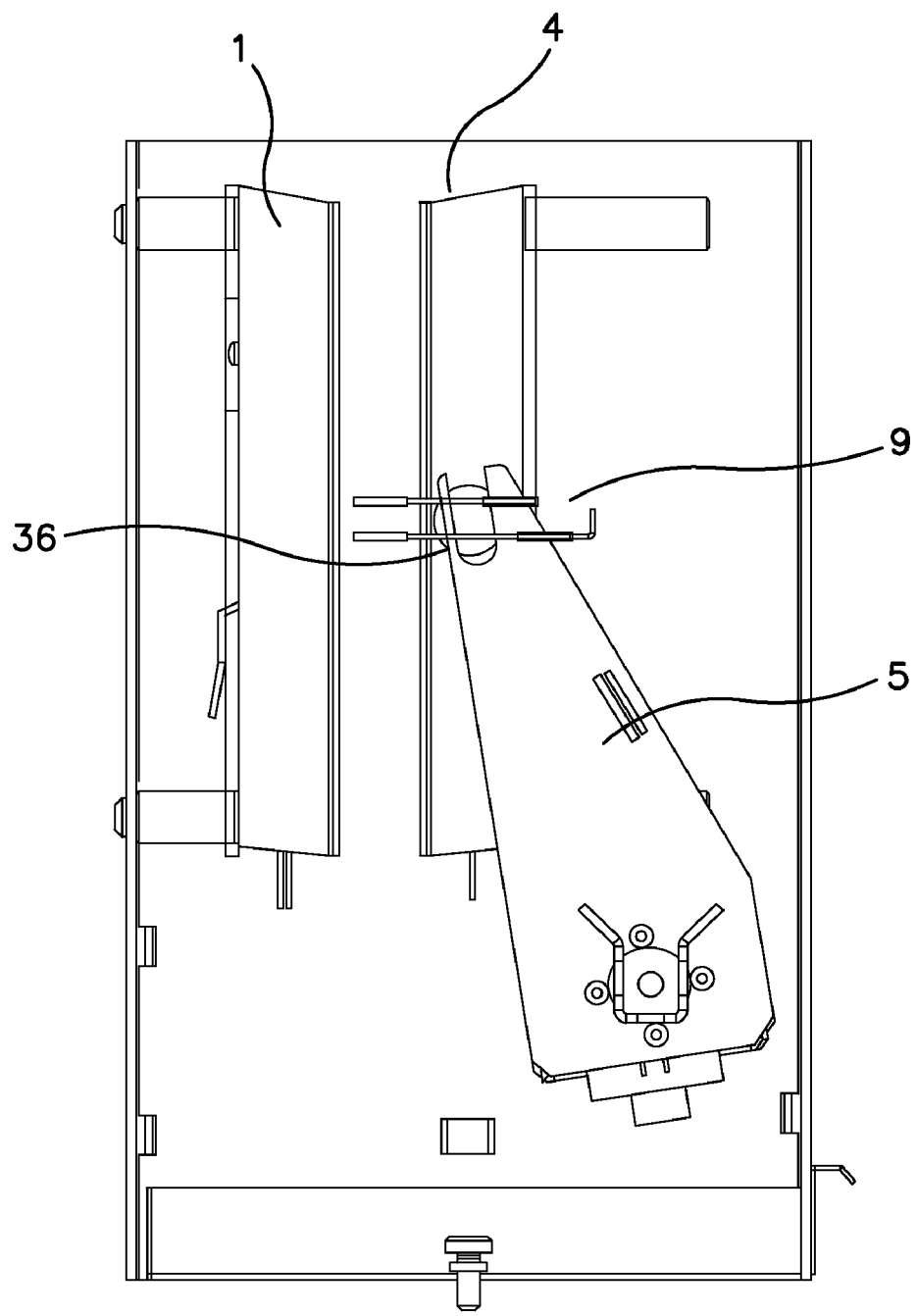
FIG. 11 shows a side view of the apparatus in an open position.

FIG. 11 shows the apparatus with the movable platen 4 in an intermediate position.

Although rigid platens are described above, the invention is not limited to this embodiment. In other embodiments, the platens may be constructed of pliable material, so as to conform to the shape of the food item. In other embodiments, each platen may be constructed of multiple, smaller, rigid members, wherein each is able to move independently of the other members. Again, this allows the platens to better conform to the shape of the food item.

FIG. 12A shows the simple form of food package 37, and FIG. 12B is a cross-sectional view through A-A of FIG. 12A. The food package 37 comprises a bag 38, such as a poly film bag, with a first ply 39 and a second ply 40. Other types of bags are also within the scope of the invention. For example, other materials capable of withstanding high temperatures, such as 375° F., including polyester or nylon, may also be used. A food item to be cooked 41 is placed between the plies 39, 40. The package 37 is sealed around its perimeter as shown by the seal 42. This seal 42 is preferably a heat seal, but could also be accomplished with adhesive, double-sided tape, etc. Sealing poly films is well known in the art and will not be discussed in detail here.

In this application, the seals 42 can be made with a predetermined separating strength, making a peelable seal. This can facilitate the removal of the food product 41 after cooking, making it easy to peel open the package 37 and remove the food product 41 with less chance of contact with the operator. The entire seal 42 can be made peelable, or only a portion of it, as preferred. There can be different peel strengths in locations around the perimeter. This can be used, for instance, to put a weak seal at the top of the package that opens at a pre-determined internal pressure during the cooking process to allow built-up gasses to escape. The ability to vent gasses may be necessary for some cooking applications. Gasses are produced when liquids inside the food product boil and evaporate. These gasses must be vented or pressure inside the package will increase until the package 37 ruptures, which can spatter scalding food, possibly injuring personnel, and spilling contents into the apparatus. The vent is preferably placed high enough in the package 37 that liquids do not reach it during cooking. The use of vertically oriented platens also allows the use of vents. Along with selective sealing, other venting methods can be used.

These include adding a separate venting apparatus or a torturous path through the seal. Many of these methods have been disclosed in prior art. Another method would be to include a mechanism in the apparatus that automatically punctures vent holes in the package when it is inserted into the apparatus for cooking, and such a mechanism will be discussed later.

Figure 13:
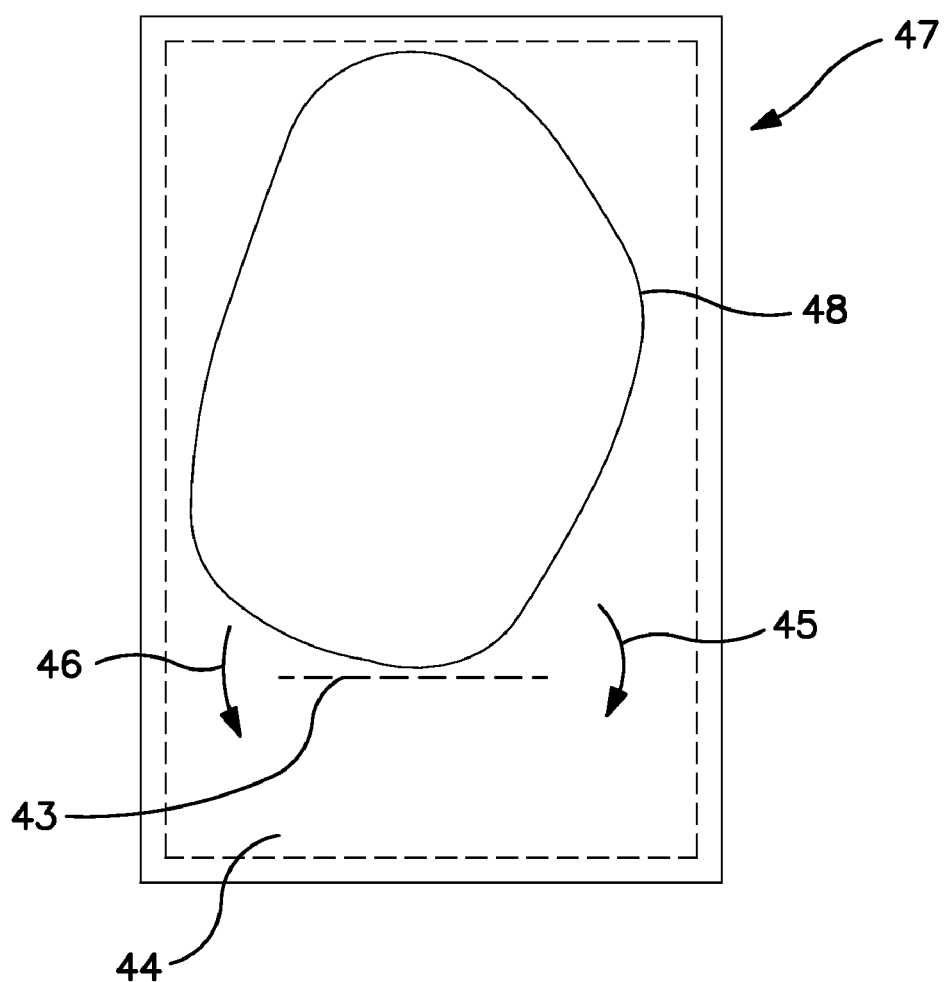
FIG. 13 shows another embodiment of the packaging for a food item.

When cooking proteins, or any food item that contains fat, grease is rendered during the cooking process. It may be preferable to remove the grease from the food item. FIG. 13 shows one method to accomplish this. This package 47 has an extended portion at its bottom end, along with a partial seal 43 that holds the food item 48 in the upper portion of the package 47 and defines a pocket 44 in the lower portion of the package 47. As the fat is rendered, the grease flows through the unsealed areas in the partition seal 45,46 and collects in the pocket 44, out of contact with the food item 48. After cooking, the food item 48 is removed, and the grease is disposed of along with the package 47. If preferred, an absorbing material, such as paper toweling, can be included in the pocket 44 to absorb and contain the grease. Similar types of package have been disclosed in prior art, such as patent applications 2007/0134378 and 2008/0087268.

Figure 19:
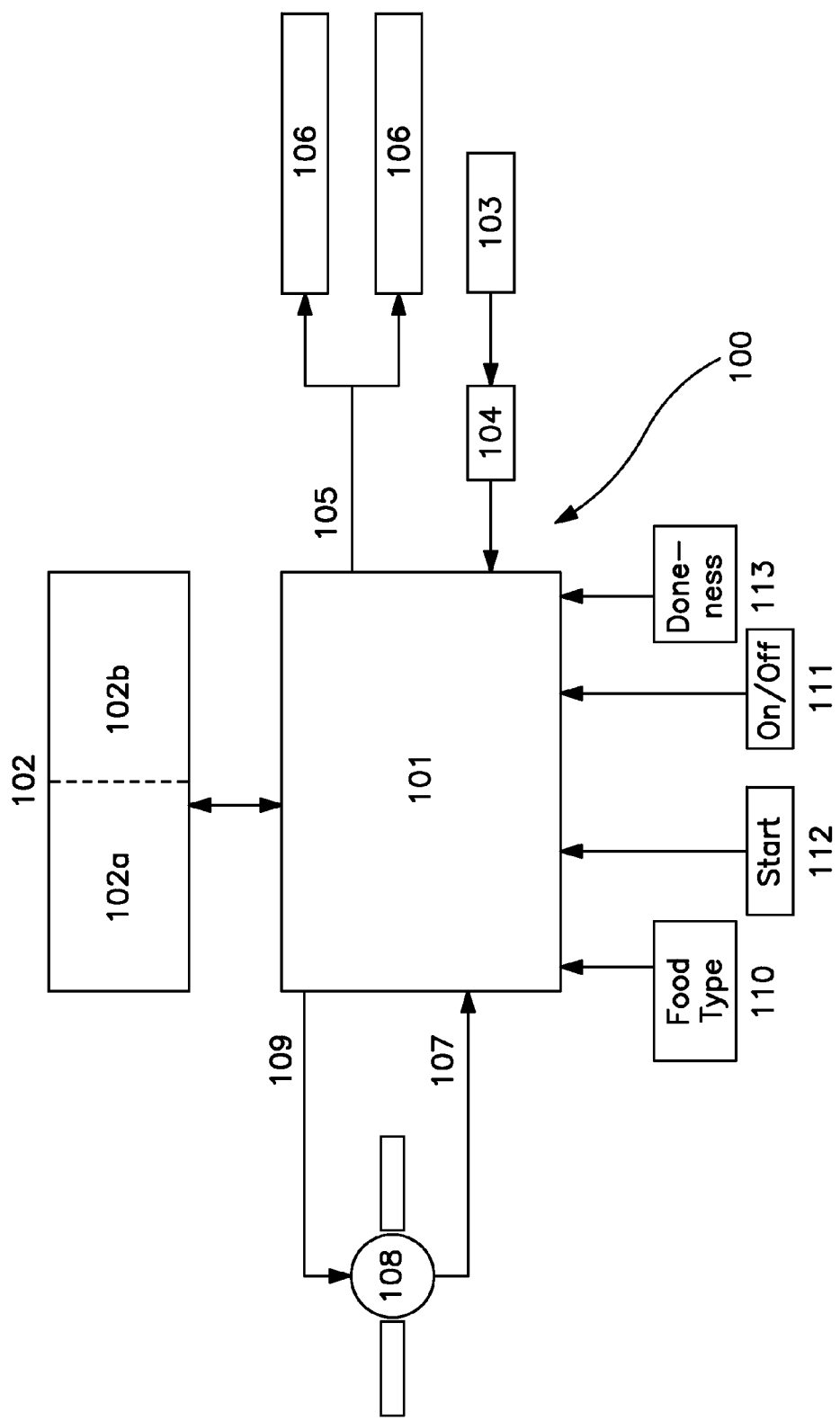
FIG. 19 is a representative schematic of one embodiment.

The apparatus also includes a control system. The control system 100, as shown in FIG. 19, includes a controller 101. The controller 101 can be in the form of a custom circuit board, PLC controller or other commonly used control device. This controller includes a memory element 102, either integrated with the controller 101, or external thereto. The memory element 102 contains volatile memory 102a, such as RAM, DRAM, etc. The volatile memory 102a is used to store data used by the controller 101. In some embodiments, the volatile memory 102a also includes the instructions that are executed by the controller. In some embodiments, the memory element 102 also includes a non-volatile memory 102b, such as FLASH ROM, EPROM, solid state disk drive, rotating media or the like. The non-volatile memory 102b retains its contents in the absence of power and therefore can be used to store the instructions executed by the controller 101. In some embodiments, other constant values, such as various parameters associated with cook time, cook temperature, etc, are also stored in non-volatile memory 102b.

The controller 101 may have several functions. For example, the controller 101 may be used to regulate the temperature of the platens, and determine the cook process for the selected food item. In some embodiments, separate controllers are used to perform these two functions. One input to the controller 101 is from the temperature sensing device 103, such as a thermocouple. This input may be analog, in which case, it is converted to a digital value using an A/D converter 104. In some embodiments, multiple thermocouple inputs are supplied to the controller 101. For example, there may be a thermocouple for each platen. One output from the controller 101 is a control signal 105 for the heating elements 106. Again, this output 105 may be analog or digital. In some embodiments, a single output is used to control the heat output of all heating elements. In other embodiments, separate outputs are generated for each heating element. In some embodiments, a simple control system is used whereby current to the heating elements is either enabled or disabled. In other embodiments, the magnitude of the current to the heating elements is varied, depending on the difference between the desired temperature and actual measured temperature.

Figure 20:
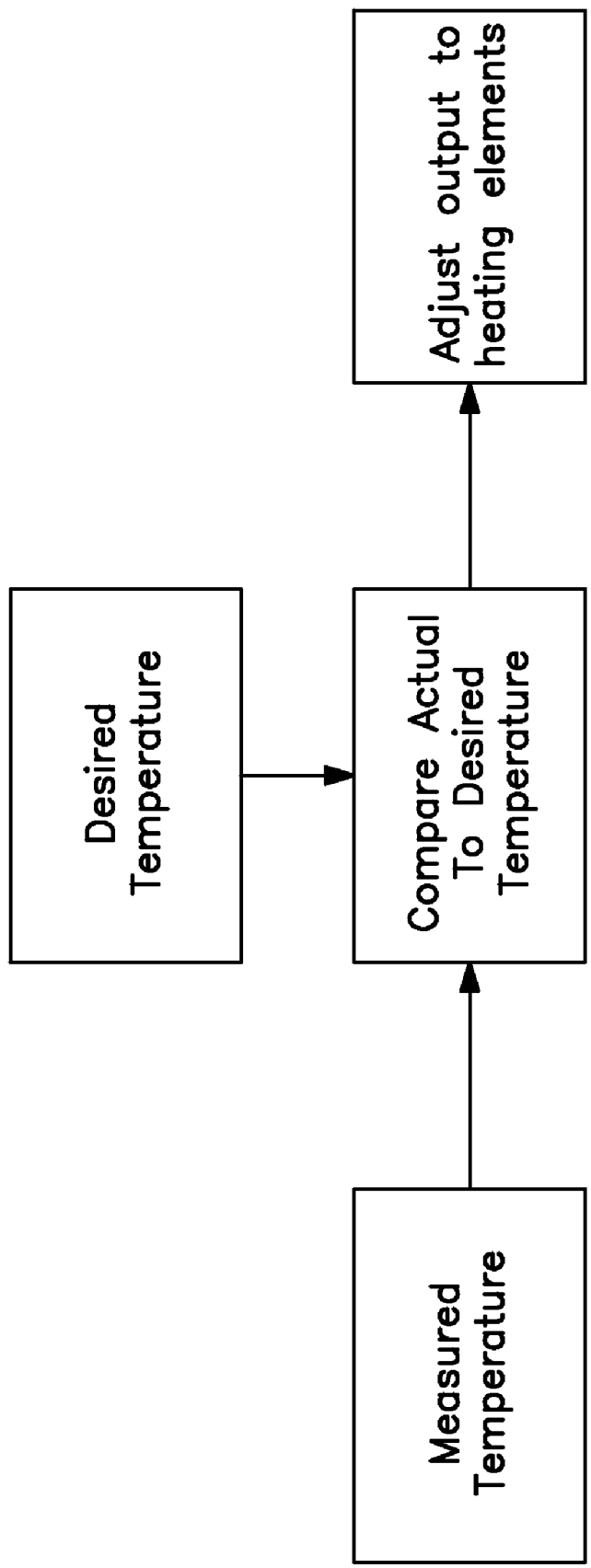
FIG. 20 shows an embodiment of a flowchart for controlling temperature.

FIG. 20 shows a flowchart of the temperature control algorithm. The desired temperature is supplied to the controller 101. In some embodiments, this desired temperature is a fixed value, such as 375 degrees F. In other embodiments, this temperature may vary. For example, the desired temperature may be a function of the particular recipe used to cook a particular food item. A recipe may, for example, specify a higher temperature in the beginning of the cooking process, and then a lower temperature for a prolonged period. The controller 101 also receives an input from the temperature sensing device 103. The controller 101 compares the desired temperature to the input from the temperature sensing device. Based on this difference, the controller 101 adjusts the output 105 to the heating elements 106. A variety of algorithms can be used to determine the appropriate output 105 to the heating elements 106. For example, a simple on/off algorithm, or a simple proportional algorithm may be used. In other embodiments, more sophisticated algorithms, such as PID control, may be used. If multiple inputs and outputs are used, the controller 101 may perform this control loop for each heating element 106, independent of the others.

Returning to FIG. 19, the controller also has inputs and outputs related to the platen and its positioning. For example, in some embodiments, an input 107 related to platen position is supplied to the controller 101. This input 107 may be from an encoder built onto the drive motor 108. In other embodiments, a stepper motor is used, and the position is monitored based on the number of steps performed in each direction. Alternatively, a linear potentiometer or other common position indicator could be utilized to determine the position of the platen between fully open and fully closed. Through the use of one or more of these means, the controller 101 may determine the separation between the platens. This allows the controller 101 to determine the thickness of a food item placed between the platens after the platens have been brought into contact therewith.

The controller 101 also includes an output 109 which is used to drive the drive means, such as motor 108. In some embodiments, this output 109 is a current and is either directly output from the controller 101, or created external to the controller. For example, the controller 101 may output an analog voltage, which is converted to a current by the external circuit. In some embodiments, this output 109 may determine the force with which the platens are moved toward one another. In other embodiments, the controller 101 monitors, either directly or indirectly, the current that is being supplied to the motor 108, as this current is proportional to the force being exerted by the motor. Through the use of an algorithm or look up table, the controller 101 can convert this applied current measurement into a force reading. Thus, the controller 101 has the ability to monitor both the position of the platens and the force with which they are being moved together (or apart). In addition, the controller 101 also controls the motor being used to move the platens. Thus, the controller 101 may vary the force applied by the platens and the relative positions of the platens, as required.

Additionally, the controller 101 has an input 110 signifying the type of food item that is to be cooked. This input 110 can be of various forms, including bar code, RFID, keyboard entry, touchscreen, etc. Other methods of entering data are also within the scope of the invention. In some embodiments, the controller 101 may have additional inputs, such as an on/off switch 111, a start switch 112, and an indication 113 of the user's doneness preference (i.e. rare, medium, well). The controller 101 also includes a timing device, such as an internal or external timer, so that it can accurately regulate cook time.

The controller 101 uses the food type input 110, the thickness of the food item (as determined by platen position), and the doneness indicator 113 to determine all of the parameters associated with cooking the food item. These parameters include cooking temperature, cooking time, and the force exerted on the food item by the platens, as described in more detail below.

The operating sequence will now be described, beginning with the warm-up cycle. When the apparatus is powered up, the warm-up cycle begins. The movable platen may be moved to the closed position as shown in FIG. 10, by the electronic controller (not shown). As described above, the controller may determine the position of the platens by use of the encoder built onto the drive motor 47, shown in FIG. 8, or by other means. As stated above, a linear potentiometer or other common position indicator may be utilized to determine the position of the platen between fully open and fully closed.

Electrical current is supplied to the platen heaters, and the temperature of the platens is monitored by the controller, such as by using the thermocouple. As stated above, the temperature of one or both platens can be monitored. When the platens reach their target cooking temperature, the controller maintains the temperature of the platens, such as by cycling the heating elements or modifying the current being supplied to the heating elements. Maintaining a consistent temperature is critical to the operation. In some embodiments, the temperature needs to be as high as possible to cook the food item as quickly as possible, as well as to obtain aesthetic browning of the surface of the food item, particularly with proteins. The temperature also can never exceed the maximum capability of the food packaging, or melting, sticking or other failures can occur. For some materials, the maximum allowable temperature is mandated by the FDA, such as at 375° F. Therefore, if the target temperature is set to 370°, only 5° of overshoot is allowable. If a good balance of platen mass and heat input is achieved, the temperature control of the platens can be accomplished by the use of a simple on/off control, with settings determined by thermal overshoot and undershoot. Once the thermal response of the platens is understood, the temperature can be controlled within a few degrees. As described above, if necessary, a more complex temperature control algorithm can be used, such as PID control, which is well known in the art.

Once the target temperature has been reached, the apparatus is ready to cook. The operator may initiate the cooking cycle by pressing a button, opening a lid, or some other means. A unique code for the particular food item is entered either manually by the operator or read automatically by the apparatus. This can be done using numerous conventional methods such as bar codes and RFID. In another embodiment, a series of holes in the product package are read by the apparatus using LEDs, electrical or mechanical contacts to produce a binary code (i.e. hole or no hole). For instance, three holes could produce eight distinct values (000, 001, 011, etc.). The unique code may correspond to a different set of cooking parameters, such as time, temperature, cook time as a function of food item thickness, and force and is dependent on the type of food item. In addition, the operator may select the desired doneness (rare, medium, well done, etc.) of certain food items, such as beef. The code can be used to access a look-up table in the controller to determine the appropriate cooking parameters. Alternatively, the code may be more than three digits, such that all of the necessary parameters are embedded therein. The length or complexity of the code is not limited by this invention and can be any indicia that are able to differentiate different cook processes.

The movable platen is actuated by the drive means and opens, preferably to its fully open position. From this position, the packaged food item may be inserted between the platens. The packaged food item can be guided between the platens in a number of ways and is not limited by the present invention. For example, a rack can be utilized that places the food item between the platens by either sliding or raising and lowering the food items into place. The food package can connect to the rack by means of holes and pins, or with a clamping mechanism. In addition to guiding and holding the package, this means can perform another function as well, such as piercing vent holes into the upper portion of the package, eliminating the need for a venting provision in the package itself, as discussed previously. A filter means can be added to the apparatus to remove odors and moisture exiting the vent. This filter can be any commonly used media such as paper or activated charcoal.

The drive means, under the control of the controller, moves the movable platen into contact with the food item. Based on feedback from the motor or other sources, the controller can regulate the amount of force applied to the food item. As noted above, the amount of force is one parameter that may vary depending on food item type. For example, the platens may exert greater force on a frozen hamburger than on fresh vegetables. As described above, one way to determine the amount of force is to monitor the electrical current passing through the drive motor. Since the drive means is preferably a D.C. motor, the current passing through the motor is directly related to the motor torque, which, in turn, controls the platen force. Thus, if the controller has an input which is proportional to motor current, it can determine the force being exerted by the platens. Another method is to use a force sensor such as a strain gage in the mechanism or on the platen to determine the force directly. Again, an input to the controller from the strain gage would allow the controller to monitor the force applied. These methods are common in the art.

Once the proper pressure has been applied, the heated platens begin to cook the food. The amount of heat transferred from the platens to the food item is affected by temperature, pressure and time. As discussed previously, the temperature may be held constant near the maximum allowable, or at a lower temperature if desired, as determined by the food code. As explained above, the amount of force pressing the platens against the food item is controlled by the controller. This force can be controlled in a number of ways. The amount of pressing force affects the transfer of heat into the food, and therefore affects the cooking time. The preferred pressing force may be determined experimentally and may be dependent on the food item being cooked. If the force is too low, it will increase the cooking time and cause uneven cooking. If the force is too high, it can crush the food item, leaving it aesthetically unpleasing. With a protein, it can also squeeze out too much liquid, leaving the food dry. The food code for each food item will determine the cooking force. If desirable, the force can be varied during the cooking process. For instance, there can be a higher force when a food item is frozen to help it to begin cooking, and a lower force once it is slacked.

Cooking time is determined by the type of food item and may be adjusted for the thickness of the item. Since the platen positions are known, the thickness of the food item is also known. A thick food item may take longer to cook than a thin one, so a cooking algorithm may be experimentally derived for each food item to determine cooking time based on thickness. For example, a particular type of food item may require 15 minutes of cook time per inch of thickness. Therefore, once the controller determines the positions of the platens and knows the thickness of the food item, it can readily determine the cook time. In other embodiments, thickness can be continually monitored as the food item cooks, and the cooking time can be altered during the cooking cycle based upon how the item is cooking in real time. As an example, a frozen food item may start at 0.75 inches thick. This thickness will remain largely unchanged until the food item thaws, or goes slack, when the thickness will rapidly change, say to 0.6 inches, when the movement will again slow. At this point, it is known that the food is thawed and has begun cooking. The cooking time will be calculated based on the current thickness. The thickness may be 0.5 inches at the completion of cooking, and the time will have been constantly recalculated during the process.

Figure 14:
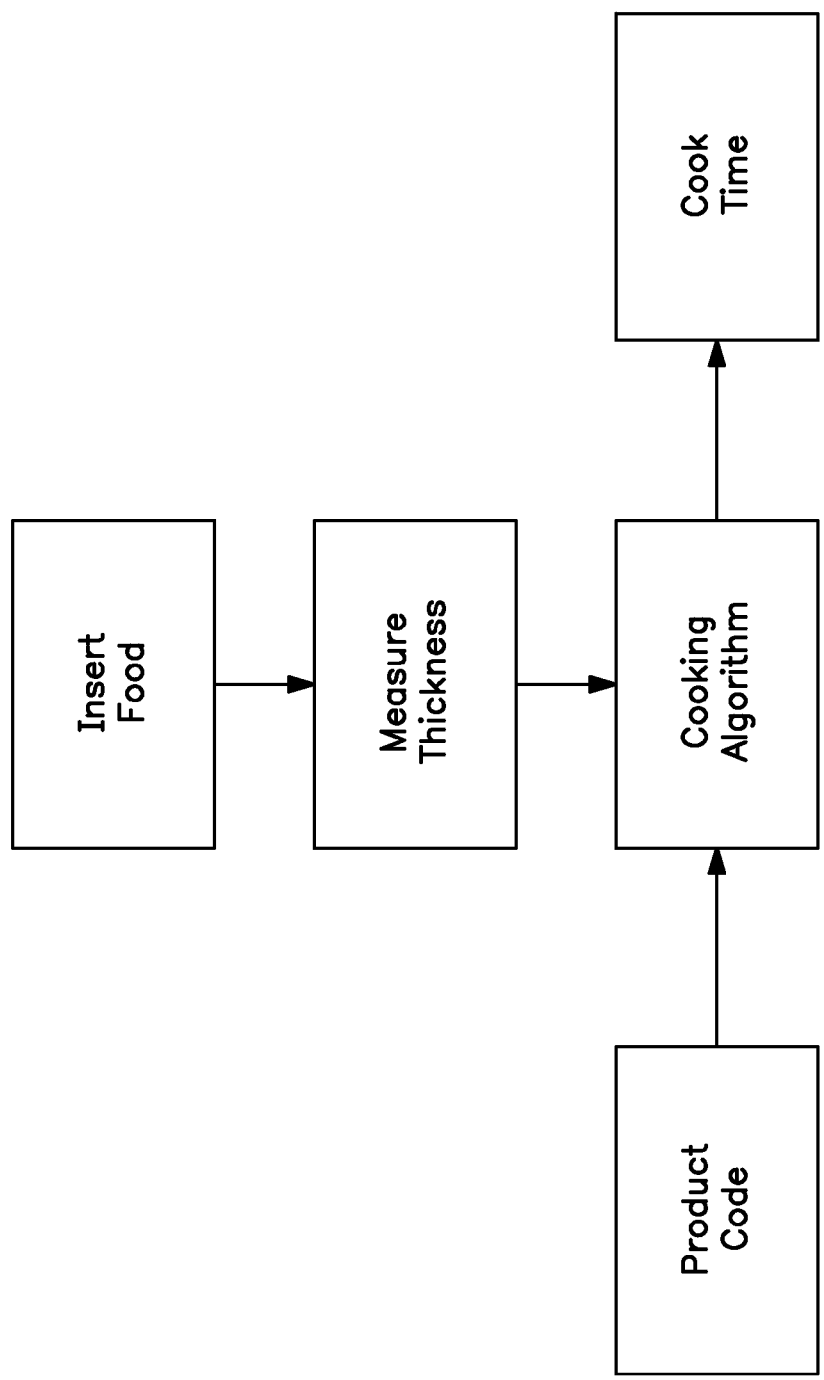
FIG. 14 shows a first embodiment of a flowchart for cooking food items.

In the simplest algorithm, the food thickness is measured at the start of the cycle, a cook time is calculated based on the food type code, and the food is cooked for the calculated time. In this scenario, the cooking time is not recalculated as the item cooks. This could be an algorithm as simple as calculating frozen protein cooking time as 6 minutes for items up to ½" thick, plus 6 minutes for every additional ¼", and slacked protein as 3 minutes for items up to ¼" thick, plus 3 minutes for every additional ¼". FIG. 14 shows a schematic representation of this flowchart. The product code is input to the controller through any of the means suggested above. This product code determines the cooking algorithm to be used. The uncooked food item is inserted, and the platens are brought together using the force dictated by the cooking algorithm for the particular food item. The thickness is measured and this value is used by the algorithm to calculate a cook time. Once the cook time has expired, the cycle is complete.

Figure 15:
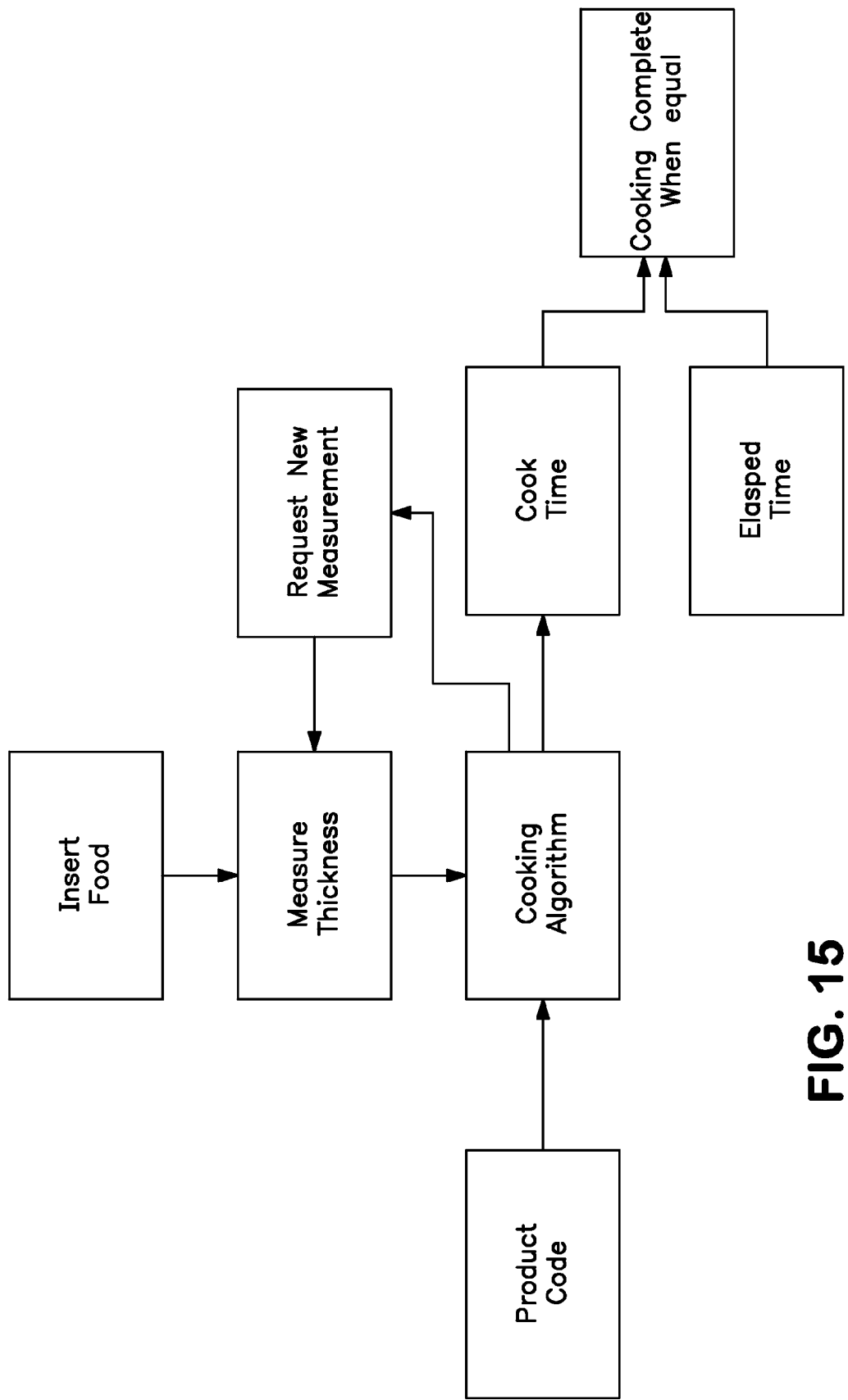
FIG. 15 shows a second embodiment of a flowchart for cooking food items.

FIG. 15 is a schematic representation of a more sophisticated, continually updating system. As above, the product code is input to the controller through any of the means suggested above. This product code determines the cooking algorithm to be used. The uncooked food item is inserted, and the platens are brought together using the force dictated by the cooking algorithm for the particular food item. The uncooked food item is inserted, the thickness is measured and the value is used by the algorithm to calculate an initial cook time based on the product code. As the product cooks, the thickness measurement is continually monitored by the controller, which uses the monitored thickness to determine a new calculated cook time. The calculated time is compared to the elapsed time. When the elapsed time and the calculated time are equal, the cycle is complete. In some embodiments, the actual temperature of the platens could be provided to the algorithm to calculate the cooking time more accurately.

In some embodiments, the current state of the food item (frozen or slack) is provided to the apparatus by the user. The controller then uses the product code in conjunction with the current state of the food item to determine the appropriate algorithm. For example, the cooking time per unit thickness would be longer for a frozen food item than for a similar slacked food item.

Figure 21:
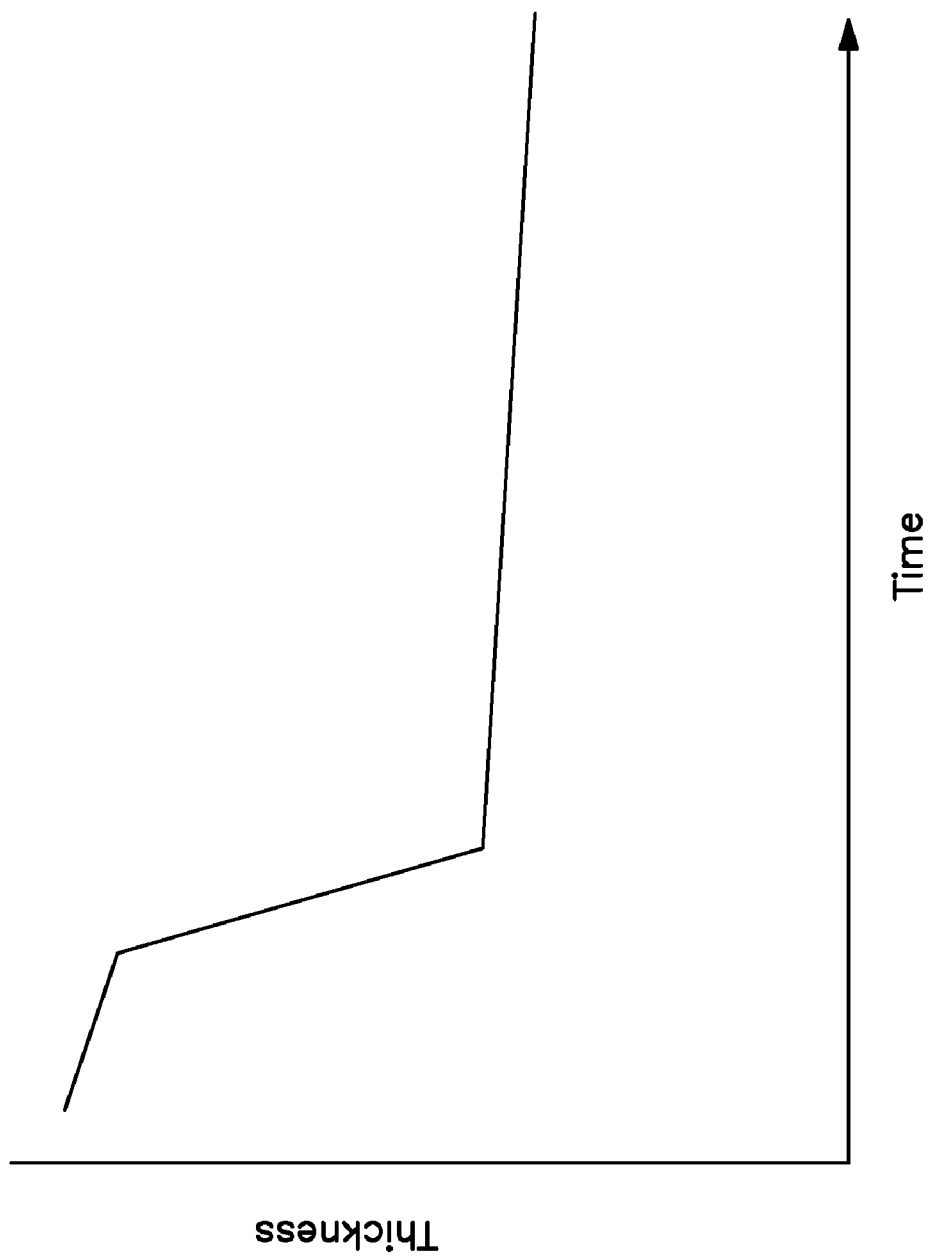
FIG. 21 shows a temperature vs. time graph.

In another embodiment, the controller automatically determines the state of the food item, such as by monitoring the thickness profile. For example, a fresh (or slacked) food item will not significantly change thickness during cooking. However, a frozen food item may decrease more significantly in thickness as it thaws, as shown in FIG. 21. By monitoring the thickness profile, as a function of time, the controller can determine whether the food item was originally frozen or not. In further embodiments, the controller may use the change in thickness, as shown in FIG. 21, to determine when the food item has thawed. This information may be used to change cook time, pressure, temperature or another parameter.

In addition to varying pressure and cook time, the controller can also be used to vary the position of the platens if necessary. For example, a particular food item may be a mixture of different foods, such as vegetables with butter, stew, or other combinations. In such combinations, it may be beneficial to vary the positions of the platens to create motion within the packaging. For example, the compression of the platens causes the food items to be squeezed, forcing the food items to spread throughout the packaging. When the platens are slightly separated, the food items tend to move toward the bottom of the packaging due to gravity. This platen position profile can be another parameter stored in the controller and associated with particular product codes.

An additional advantage of the current invention is the ability to keep the food item warm after cooking. This hold time is sometimes necessary if, for example, other items need to be completed before serving. This is most easily accomplished by opening the platens some or all of the way to minimize or eliminate contact with the food item. In this manner, the open platens create a warming chamber between them to keep the food warm. Even though the platens are still at or near cooking temperature, cooking does not continue without contact between the platens and the food item. Lowering the temperature of the platens, while maintaining contact with the food item may also be possible to achieve a warming cycle. However, platens may hold their heat well enough to make the change in temperature too slow, even if power is reduced to the heaters. Since the food item is still in its packaging, it retains its moisture and does not dry out while waiting.

Thus far, an apparatus and method to cook food to a predetermined doneness has been disclosed. This doneness relates to the internal temperature of the food item. FIG. 16 shows examples of internal cooking temperatures for various meats. Obtaining the correct internal temperatures while cooking is critical, both for food safety and taste. The methods thus far are aimed at obtaining the desired internal temperatures without direct measurement of the food item's internal temperature by using platen temperature, force and time.

In some embodiments, it may be preferable to avoid direct temperature measurement. While it is easy to measure the surface temperature of the food item, this does not directly relate to its internal temperature. Measuring the internal temperature requires piercing the package and inserting a probe into the food item. Doing this raises concerns with cross-contamination and leakage. If direct measurement is desired, the following is an improved method for inserting a probe and eliminating the aforementioned concerns.

Figure 17:
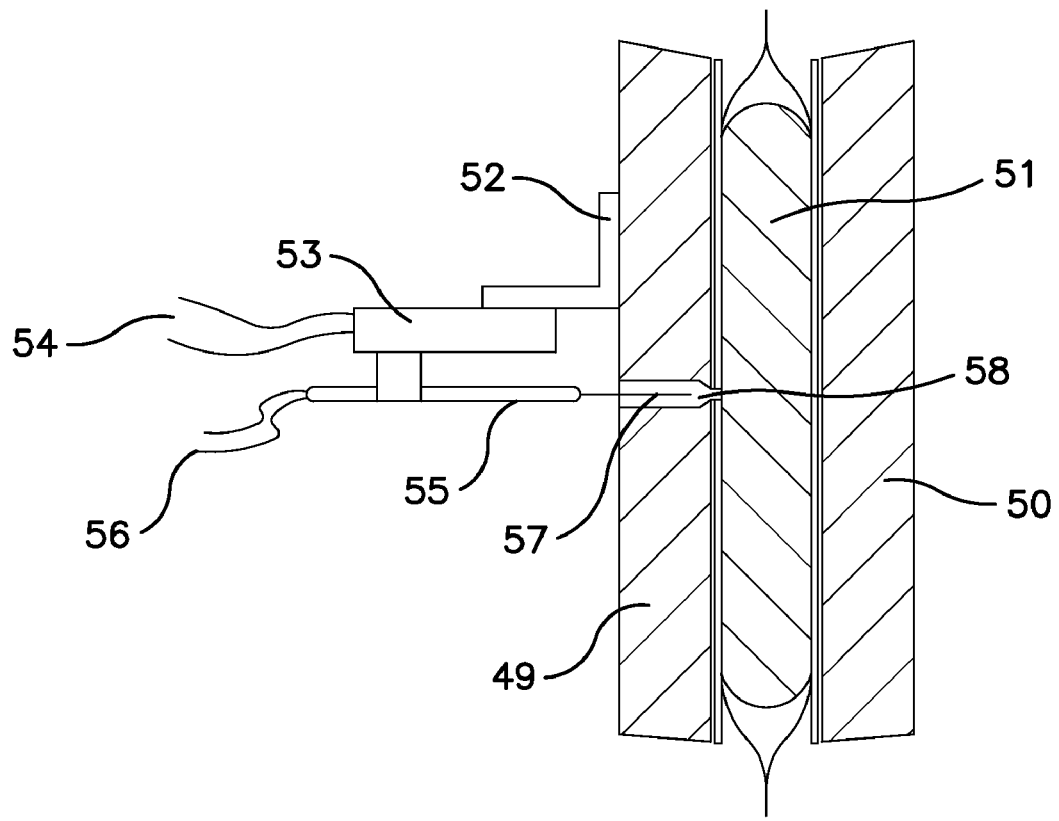
FIG. 17 shows an embodiment with a temperature probe.
Figure 18:
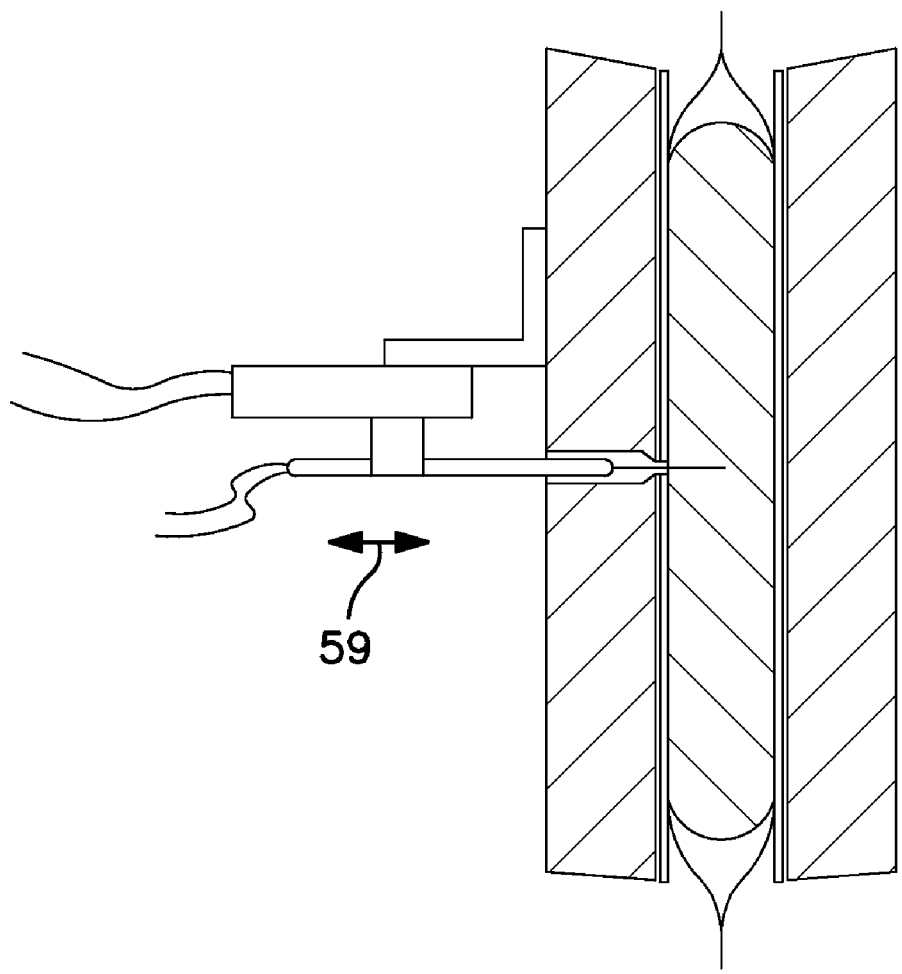
FIG. 18 shows the embodiment of FIG. 17 with the temperature probe inserted into the food item.

FIG. 17 is a cross-sectional view showing the first platen 49 and the movable platen 50, with a cooking food item 51 between. A bracket or other support member 52 attaches to a linear actuator 53, which is connected to the controller (not shown) by electrical leads 54. Attached to the linear actuator is a temperature probe 55 that connects to the controller with leads 56. The tip of the temperature probe 57 is preferably a small diameter device, such as a thermocouple sold by Omega Engineering, part number KMTSS-040U-12, which is 0.040" in diameter. The linear actuator 53 can be any type common in the art, but is preferably a sliding actuator with a potentiometer feedback for position indication. One such device is model number PQ12s, manufactured by Firgelli Technologies, Inc. of Surrey, British Columbia. When the actuator 53 is energized, the temperature probe 55 is moved into a forward position, puncturing the food package and entering the food item 51 being cooked, as shown in FIG. 18. In this manner, the probe 55 measures the actual internal temperature of the food item 51.

In one embodiment, the probe 55 is placed in the center of the food item 51. As discussed above, the controller can determine when the frozen food has gone slack. The system can wait until that point to insert the probe 55 and begin monitoring the internal temperature, rather than forcing the probe into the frozen food. Since the controller knows the thickness of the food item 51, as well as the position of the probe 55, it can insert the probe 55 into the center of the food item 51. As the thickness of the cooking food changes, the probe 55 can be moved to remain in the center. The controller continuously monitors the internal temperature of the food item. When the internal temperature reaches the desired value, which is determined by the food product code, the actuator retracts the probe 55 back to the position shown in FIG. 17, then the platens are opened and the cooking cycle is complete. The leakage from the probe insertion point is minimal since the probe 55 is small in diameter and, during the cooking cycle, the packaging film tends to make a seal around the probe, preventing leaks. Even though the probe 55 is in contact with the food, contamination is eliminated when the probe is drawn back into its starting position. As shown in FIG. 17, the probe resides in a chamber 58 in the platen. The entire platen is at an elevated temperature, such as 370°, so the probe is exposed to this temperature between cycles. This temperature is sufficiently hot to kill off contaminants such as fungi, bacteria and viruses.

In another embodiment, once the probe 55 has been inserted into the food item, it searches for the coolest location, since it is not necessarily in the center of the item. The probe 55 measures the temperature as it is inserted, then indexes back and forth along arrow 59 until it finds the coolest location. This process can be continuously performed as the food cooks, to insure that the probe is always in the coolest location and that no part of the food item is undercooked.

Alternately, the package, or a portion of the package at the thermocouple location may be made from a stretchable material, such as silicone. The stretchable material may act as a protective sheath, allowing the probe to be inserted into the food item without puncturing the package. The temperature is measured through the package material and the probe does not contact the food directly, completely eliminating the possibility of contamination or leakage.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. An apparatus for cooking a packaged food item, comprising:
   a. two vertically oriented platens, where each platen is heated to a temperature capable of cooking a packaged food item, and wherein at least one of said platens is movable in relation to the other;
   b. drive means, configured to move at least one of said platens relative to the other platen; and
   c. a controller, configured to control said drive means, having an output used to supply power to said drive means, wherein said controller monitors current applied to said drive means and varies said output so as to control said current, so as to move said platens together to contact said packaged food item, with a predetermined force proportional to said current.

2. The apparatus of claim 1, wherein said controller is configured to determine the distance between said platens.

3. The apparatus of claim 1, further comprising a temperature sensing device in proximity with at least one of said platens.

4. The apparatus of claim 3, wherein said controller regulates the temperature of said platens.

5. The apparatus of claim 1, wherein said controller maintains said force applied by said platens on the packaged food item at a constant level.

6. The apparatus of claim 1, further comprising a temperature probe mounted to an actuating means and adapted to be inserted into said packaged food item.

7. The apparatus of claim 6, wherein the distance between the platens is used to calculate a position substantially midway between said platens, and said actuating means places said temperature probe in said position.

8. The apparatus of claim 7, wherein said distance between said platens is monitored during the cooking cycle, wherein the location of said midway point is recalculated and said actuating means places the probe into the recalculated midway point at least once during the cooking cycle.

9. The apparatus of claim 6, wherein said actuating means indexes said temperature probe while monitoring the temperature to find a location inside said packaged food item that is coolest.

10. The apparatus of claim 1, wherein said controller is configured to control the temperature of the platens, the movement and force applied by the platens, to determine the distance between the platens, and to calculate the cooking time for said packaged food item.

11. The apparatus of claim 1, wherein said controller is adapted to receive an input that corresponds to a particular type of packaged food item, wherein said input is used to identify a set of cooking parameters used in cooking said packaged food item.

12. The apparatus of claim 11, wherein said cooking parameters are selected from the group consisting of cook temperature, cooking time, force applied to said packaged food item and distance between platens.

13. The apparatus of claim 11, wherein said controller comprises a storage element containing a table of cooking parameters, and said input determines which set of cooking parameters is used.

14. The apparatus of claim 11, wherein said input comprises said set of cooking parameters.

15. The apparatus of claim 11, wherein said controller is configured to determine the distance between said platens and said distance is used in conjunction with said input to identify said set of cooking parameters.

16. The apparatus of claim 15, wherein said distance is recalculated during the cooking cycle, and said cooking parameters are modified based on said recalculated distance.

17. The apparatus of claim 1, wherein said apparatus further comprises means to hold said packaged food item during cooking.

18. The apparatus of claim 1, wherein said apparatus further comprises means to make ventilation openings in said package.

19. The apparatus of claim 18, wherein said apparatus further comprises a filter configured to absorb odor or moisture from said ventilation openings.

20. A method of cooking a packaged food item utilizing a cooking apparatus having two vertically oriented platens, comprising;
  a. controlling the platen temperature,
  b. monitoring current applied to a motor;
  b. pressing said platens against said packaged food item with a predetermined force by applying power to said motor, wherein said predetermined force is proportional to said current, based on a cooking algorithm for said packaged food item,
  c. determining the distance between said platens when said platens stop moving; and
  d. calculating the cooking time required to cook said packaged food item based on said predetermined force and said distance.

21. The method of claim 20, wherein said calculation of the cooking time is based on a predetermined algorithm.

22. The method of claim 20, further comprising providing an indication of the particular type of packaged food item to be cooked.

23. The method of claim 22, wherein an algorithm selects a set of cooking parameters based on said indication.

24. The method of claim 22, wherein said indication is input either manually or automatically.

25. A cooking apparatus for cooking a packaged food item, comprising one or more vertically oriented platens and a controller in communication with a memory element, wherein said memory element comprises an algorithm that determines cooking time, the temperature of the platens and the force to be applied by the platens against the packaged food item, based on parameters that correspond to a particular type of packaged food item, where the force applied is determined by monitoring current applied to a motor.

26. The cooking apparatus of claim 25, further comprising means to determine the distance between said platens, wherein said algorithm varies said cooking time based on said determined distance.

27. The cooking apparatus of claim 26, wherein one or both of the temperature of the platens and the force of the platens against the packaged food item can vary during the cooking process.

28. The cooking apparatus of claim 26, wherein said algorithm is configured to determine whether packaged said food item is frozen or slacked based on said determined distance.

29. An apparatus, having at least two vertically oriented platens, for cooking a packaged food item that calculates the desired force to be applied by said platens on said packaged food item based on the type of said packaged food item, monitors the current applied to a motor, converts that monitored current into an applied force, and varies an output to said motor to maintain desired force.

30. A method of cooking and keeping warm a packaged food item, utilizing a cooking apparatus having two vertically oriented platens, comprising;
  a. controlling the platen temperature,
  b. opening the platens to create a gap between said platens;
  c. positioning said packaged food item in said gap;
  e. monitoring current applied to a motor;
  f. pressing said platens against said packaged food item with a predetermined force by applying power to said motor, wherein said predetermined force is proportional to said current;
  g. cooking said packaged food item according to a cooking algorithm, and
  h. opening said platens to create a gap between said platens so that said packaged food item remains in said gap.

31. The apparatus of claim 1, wherein said package has a maximum allowable temperature, and said apparatus further comprises a second controller configured to heat said platens, wherein said second controller ensures said platens do not exceed said maximum temperature.

32. The method of claim 20, wherein said package has a maximum allowable temperature and said platen temperature is controlled to ensure said maximum temperature is not exceeded.

33. The cooking apparatus of claim 25, wherein said package has a maximum allowable temperature and said temperature of said platens does not exceed said maximum temperature.

* * * * *